United States Patent
Roger et al.

(10) Patent No.: US 12,013,484 B2
(45) Date of Patent: Jun. 18, 2024

(54) RADAR RECEIVING SYSTEM AND METHOD FOR COMPENSATING A PHASE ERROR BETWEEN RADAR RECEIVING CIRCUITS

(71) Applicant: Infineon Technologies AG, Neubiberg (DE)

(72) Inventors: Andre Roger, Munich (DE); Dian Tresna Nugraha, Bandung (ID); Simon Achatz, Munich (DE)

( * ) Notice: Subject to any disclaimer, the term of this patent is extended or adjusted under 35 U.S.C. 154(b) by 530 days.

(21) Appl. No.: 17/324,375

(22) Filed: May 19, 2021

(65) Prior Publication Data

US 2021/0364599 A1 Nov. 25, 2021

(30) Foreign Application Priority Data

May 20, 2020 (DE) ...................... 10 2020 113 678.1

(51) Int. Cl.
| | |
|---|---|
| *G01S 7/40* | (2006.01) |
| *G01S 7/35* | (2006.01) |
| *G01S 13/34* | (2006.01) |
| *G01S 13/87* | (2006.01) |
| *G01S 13/931* | (2020.01) |

(52) U.S. Cl.
CPC .......... *G01S 7/4021* (2013.01); *G01S 7/356* (2021.05); *G01S 13/87* (2013.01); *G01S 13/931* (2013.01); *G01S 13/343* (2013.01)

(58) Field of Classification Search
CPC ........ G01S 7/4021; G01S 7/356; G01S 13/87; G01S 13/931; G01S 13/343

USPC ........................................................... 342/70
See application file for complete search history.

(56) References Cited

U.S. PATENT DOCUMENTS

| | | | | |
|---|---|---|---|---|
| 6,137,439 | A * | 10/2000 | Bradford | G01S 13/536 342/159 |
| 9,041,596 | B2 * | 5/2015 | Kuwahara | G01S 13/42 342/147 |
| 9,107,586 | B2 * | 8/2015 | Tran | A61B 5/7271 |
| 9,213,091 | B2 * | 12/2015 | Kishigami | G01S 7/282 |
| 9,753,132 | B1 * | 9/2017 | Bordes | G01S 13/325 |
| 10,215,842 | B2 * | 2/2019 | Phillips | G01S 7/282 |

(Continued)

FOREIGN PATENT DOCUMENTS

EP  3524999 A1 * 8/2019 ............. G01S 13/32

*Primary Examiner* — Nuzhat Pervin
(74) *Attorney, Agent, or Firm* — Eschweiler & Potashnik, LLC

(57) ABSTRACT

According to one embodiment, a radar receiving system is provided comprising a first receiving circuit, a second receiving circuit, a spectral analyzer, an object detector, and a phase compensation circuit. The spectral analyzer is configured to generate, from a first plurality of reception signals, a first set of Fourier transformation output values and, from a second plurality of reception signals, a second set of Fourier transformation output values. The object detector is configured to determine a range/Doppler bin of a plurality of range/Doppler bins as an estimate of a range and speed of an object. The phase compensation circuit is configured to determine a phase offset between the Fourier transformation output values of the first set and second set of Fourier transformation output values and to compensate the phases of at least a part of the second set of Fourier transformation output values by the determined phase offset.

19 Claims, 20 Drawing Sheets

(56) References Cited

U.S. PATENT DOCUMENTS

| | | | | |
|---|---|---|---|---|
| 10,517,479 B2* | 12/2019 | Tran | A61B 5/0022 |
| 10,539,645 B2* | 1/2020 | Bialer | G01S 3/50 |
| 10,539,672 B2* | 1/2020 | Bilik | G01S 13/343 |
| 10,557,931 B2* | 2/2020 | Schoor | G01S 13/584 |
| 10,613,200 B2* | 4/2020 | Hallstig | G01S 7/4815 |
| 10,613,220 B2* | 4/2020 | Ling | G01S 7/412 |
| 10,641,881 B2* | 5/2020 | Searcy | G01S 7/032 |
| 10,754,018 B2* | 8/2020 | Slemp | H01Q 21/08 |
| 10,809,353 B2* | 10/2020 | Subburaj | G01S 7/354 |
| 10,823,836 B2* | 11/2020 | Wintermantel | G01S 13/584 |
| 10,976,431 B2* | 4/2021 | Harris | G01S 7/023 |
| 11,215,692 B2* | 1/2022 | Itkin | G01S 13/931 |
| 11,428,796 B2* | 8/2022 | Nam | G01S 7/35 |
| 11,789,138 B2* | 10/2023 | Chen | G01S 7/352 342/111 |
| 11,835,641 B2* | 12/2023 | Loesch | G01S 13/02 |
| 2005/0110675 A1* | 5/2005 | Gruener | G01S 13/4445 342/146 |
| 2008/0150795 A1* | 6/2008 | Wakayama | G01S 7/2813 342/107 |
| 2016/0084941 A1* | 3/2016 | Arage | G01S 7/2921 342/91 |
| 2016/0084943 A1* | 3/2016 | Arage | G01S 13/726 342/102 |
| 2017/0363714 A1* | 12/2017 | Rao | G01S 13/931 |
| 2018/0292510 A1* | 10/2018 | Rao | G01S 7/4026 |
| 2018/0322389 A1* | 11/2018 | O'Shea | G06N 3/045 |
| 2019/0094353 A1* | 3/2019 | Davis | G01S 13/878 |
| 2019/0101617 A1* | 4/2019 | Kishigami | G01S 7/0233 |
| 2019/0178985 A1* | 6/2019 | Roh | G01S 7/354 |
| 2019/0187277 A1* | 6/2019 | Ling | G01S 7/412 |
| 2019/0214724 A1* | 7/2019 | Schrattenecker | G01S 7/4017 |
| 2020/0025899 A1* | 1/2020 | Starzer | G01S 7/352 |
| 2020/0191906 A1* | 6/2020 | Mayer | G01S 13/584 |
| 2020/0200879 A1* | 6/2020 | Hallstig | G01S 7/4863 |
| 2020/0301000 A1* | 9/2020 | Rao | H01Q 3/2629 |
| 2020/0379084 A1* | 12/2020 | Breen | G01S 7/032 |
| 2021/0003701 A1* | 1/2021 | Sturm | G01S 7/354 |
| 2021/0333385 A1* | 10/2021 | Rohani | G01S 13/87 |
| 2021/0364626 A1* | 11/2021 | Schoor | G01S 13/931 |
| 2022/0299599 A1* | 9/2022 | Sahara | G01S 13/536 |
| 2022/0342036 A1* | 10/2022 | Rao | G01S 13/343 |
| 2023/0066031 A1* | 3/2023 | Cattle | G01S 7/032 |

* cited by examiner

RADAR RECEIVING SYSTEM AND METHOD FOR COMPENSATING A PHASE ERROR BETWEEN RADAR RECEIVING CIRCUITS

REFERENCE TO RELATED APPLICATION

This application claims priority to German Application No. 10 2020 113 678.1, filed on May 20, 2020, the contents of which are hereby incorporated by reference in their entirety.

BACKGROUND

The present disclosure relates to radar receiving systems and methods for compensating a phase error between radar receiving circuits.

For the determination of direction of arrival of radar using echo signals in a radar receiver, the phase differences between the antennas of an antenna array may be used. A higher number of antennas in the antenna array allows a higher angular resolution of the determination. However, the number of antennas of the antenna array may be higher than the number that can be provided or handled by a single receiver circuit, e.g. a single receiver chip such as a monolithic microwave integrated circuit (MMIC). Thus, it may be necessary to use multiple receiver circuits which in turn raises the issue of phase errors between the receiver circuits, which deteriorate the accuracy of the determination of direction of arrival. Therefore, to maintain the benefit of using a high number of antennas with regard to accuracy of the determination of direction of arrival, efficient approaches for compensating phase errors between radar receiving circuits are desirable.

SUMMARY

According to one embodiment, a radar receiving system is provided including a first receiving circuit including a first plurality of antennas and configured to receive a first plurality of reception signals via the first plurality of antennas, a second receiving circuit including a second plurality of antennas and configured to receive a second plurality of reception signals via the second plurality of antennas, a spectral analyzer configured to generate, from the first plurality of reception signals, a first set of Fourier transformation output values including Fourier transformation output values assigned to each of a plurality of range/Doppler bins and, from the second plurality of reception signals, a second set of Fourier transformation output values including Fourier transformation output values assigned to each of the plurality of range/Doppler bins, an object detector configured to determine a range/Doppler bin of the plurality of range/Doppler bins as an estimate of a range and speed of an object from the first set of Fourier transformation output values and the second set of Fourier transformation output values and a phase compensation circuit configured to determine a phase offset between the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate and to compensate the phases of at least a part of the second set of Fourier transformation output values by the determined phase offset.

According to another embodiment, a method for compensating a phase error between radar receiving circuits according to the above radar receiving system is provided.

BRIEF DESCRIPTION OF DRAWINGS

In the drawings, like reference characters generally refer to the same parts throughout the different views. The drawings are not necessarily to scale, emphasis instead generally being placed upon illustrating the principles of the described embodiments. In the following description, various aspects are described with reference to the following drawings, in which.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
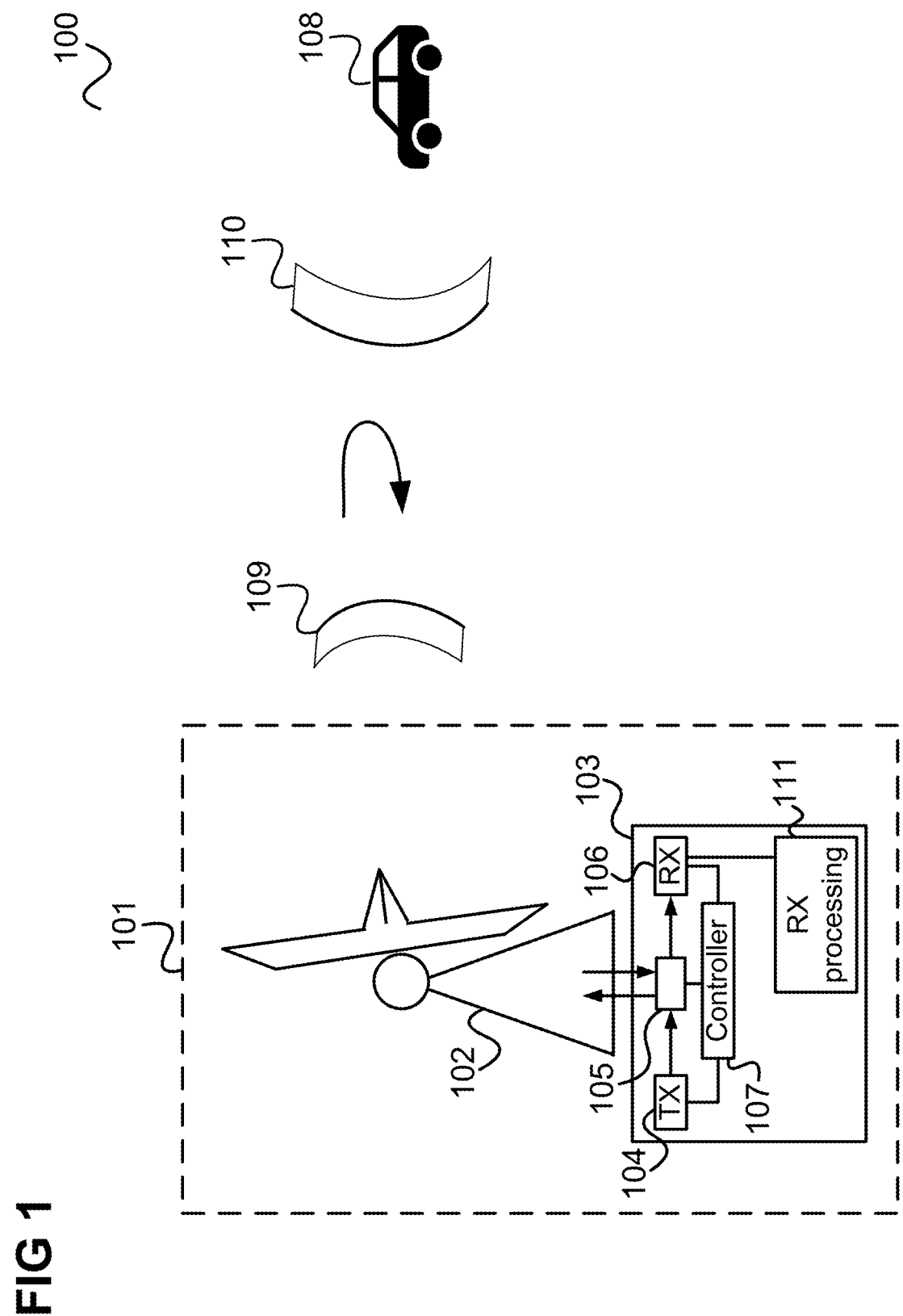
FIG. 1 shows an example radar arrangement.

FIG. 1 shows an example radar arrangement 100.

The radar arrangement 100 includes a radar device 101 that includes an antenna arrangement 102 and a radar control device 103. The radar control device 103 includes one or more (radar) transmitters 104, a duplexer 105 (i.e. a circuit to separate transmitted signals from received signals), a (radar) receiver 106 and a controller 107. The radar arrangement, although illustrated as a dish here, may include multiple transmit antennas in the form of a transmit antenna array and multiple receive antennas in the form of a receive antenna array.

For the detection of an object 108, the controller 107 controls the one or more transmitters 104, the duplexer 105, and the receiver 106 as follows:
1. The one or more transmitters 104 transmit a transmit signal 109 via the antenna arrangement 101.
2. The transmit signal 109 is reflected by a target;
3. The radar device 101 receives the echo 110 of the transmitted signal as receive signal.

From the received signal, the radar control device 103 (e.g. a radar signal processing circuit 111) calculates information about position and speed of the object 108.

It should be noted that while in the radar arrangement 100 of FIG. 1 the radar device 101 is illustrated as a (big) stationary installment detecting a large object 108 like the illustrated vehicle, a radar device 101 may also be mobile, may be smaller and may be used to detect smaller objects. For example, a radar device may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar.

Figure 2:
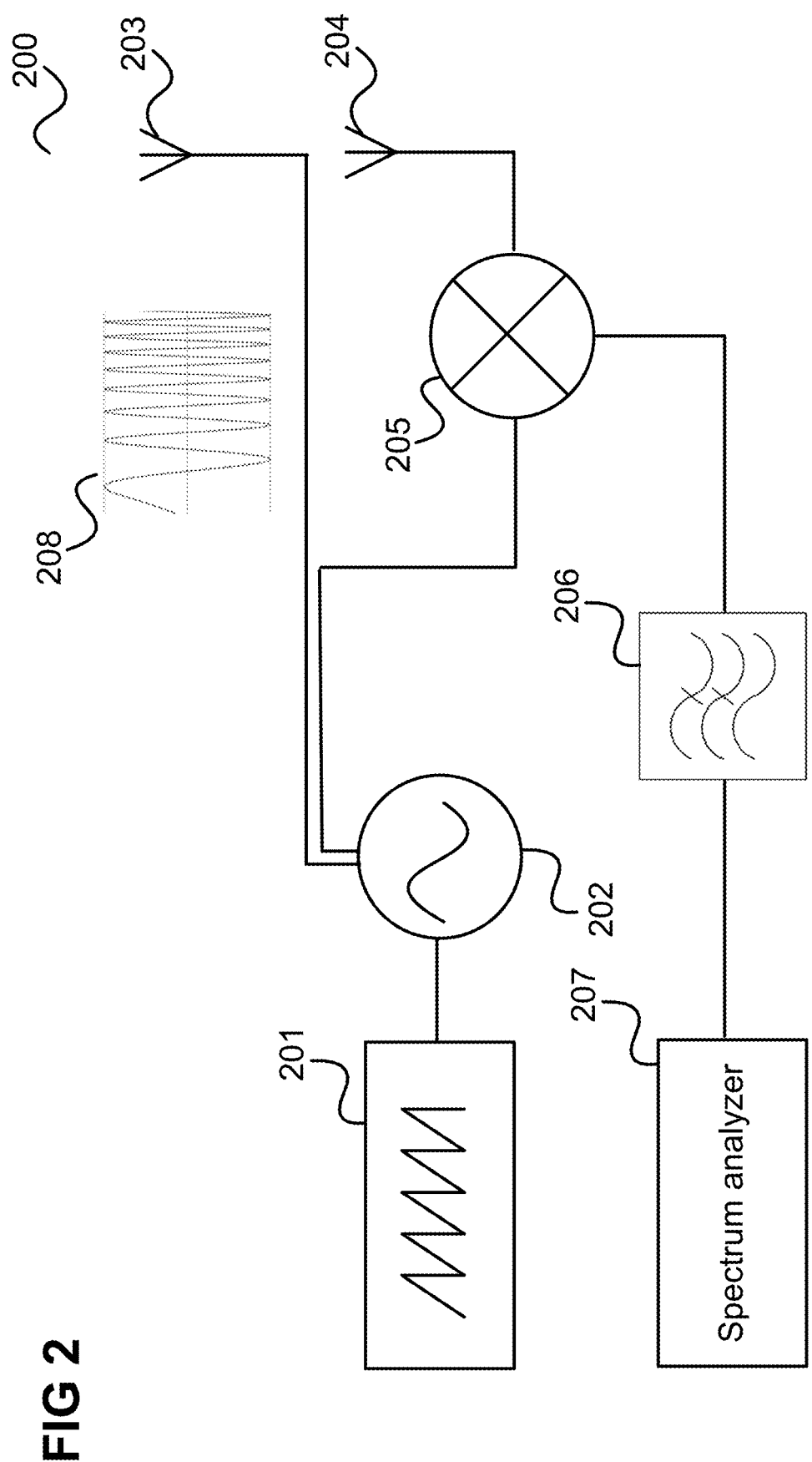
FIG. 2 illustrates an example frequency-modulated continuous-wave (FMCW) radar system.

FIG. 2 illustrates an FMCW radar system 200.

In an example FMCW radar system, rather than sending a transmit signal with a constant frequency, the frequency of the transmit signal is periodically ramped up and reset according to a saw tooth (or alternatively a triangle) waveform 201. The saw tooth waveform 201 frequency-modulates an oscillator 202 and the resulting transmit signal is fed to a transmit antenna 203.

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps, which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT) as well as velocity information (by a second stage FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207.

To further allow determination of a direction of the object 108 with respect to the radar device 101, the antenna arrangement 101 may include a plurality of receive antennas, i.e. an array of receive antennas. The direction of an object 108 may then be determined from phase differences by which the receive antennas receive an echo from an object 110. Accordingly, a radar receiver may include a mixer 205, an analog filter 206 and an ADC for each receive antenna.

The signals received by a plurality of antennas may be processed by means of an MMIC (Monolithic Microwave Integrated Circuit). Since the number of receive signals that an MMIC may process in parallel is limited (and thus an MMIC can only serve a limited number of receive antennas), multiple MMICs may be cascaded to allow using a higher number of receive antennas and thus improve angular resolution of the radar device 101.

Figure 3:
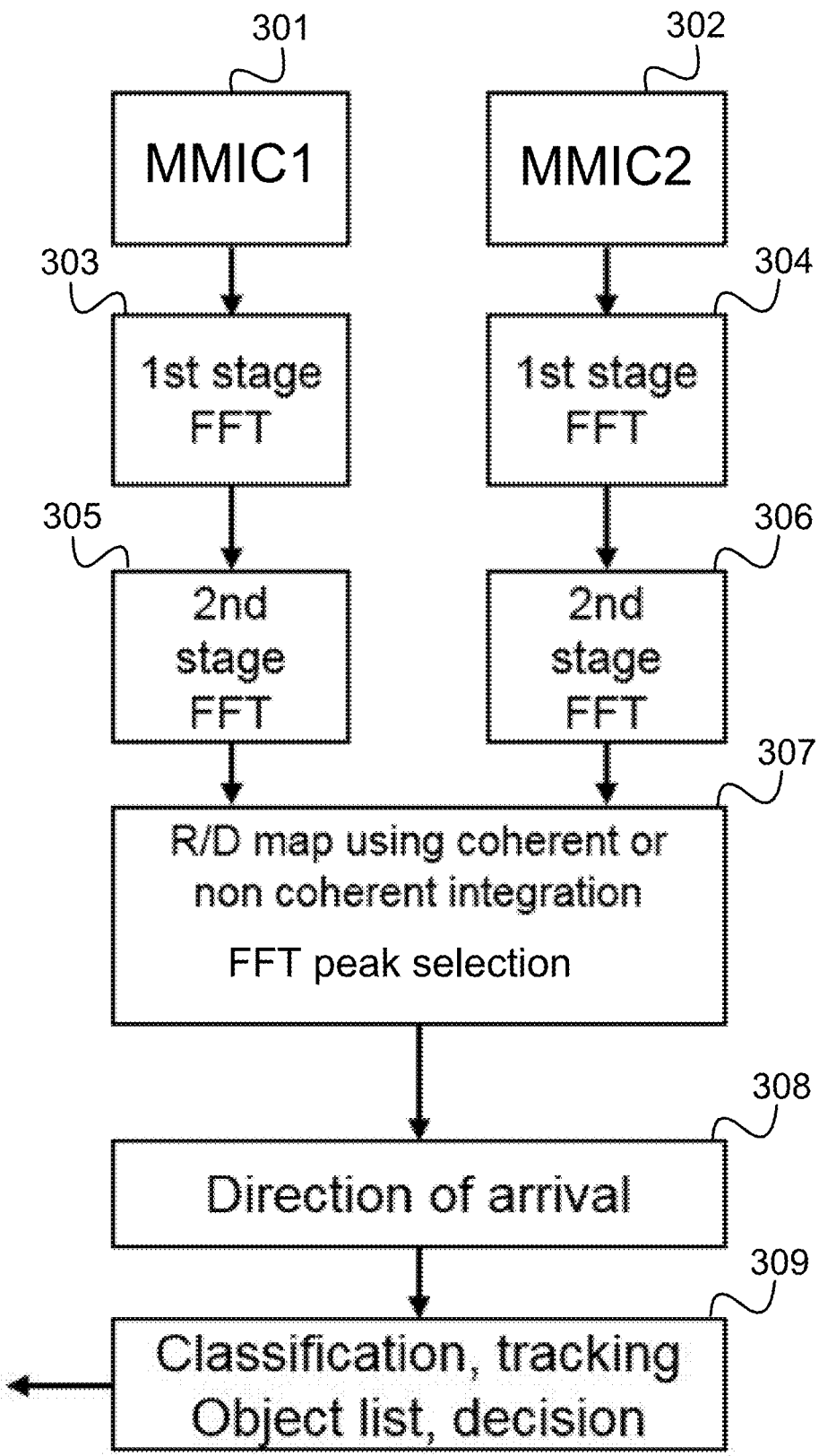
FIG. 3 illustrates an example of processing of radar receive signals using two monolithic microwave integrated circuits (MMICs).

FIG. 3 illustrates an example of processing of radar receive signals using two MMICs 301, 302.

MMICs 301, 302 are, for example, part of the receiver 106. Each MMIC 301, 302 is coupled with a plurality of antennas and is supplied with received signals from the respective plurality of antennas. The MMICs 301, 302 perform processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. Each MMIC 301, 302 supplies the resulting digitized receive signals to a respective first FFT (Fast Fourier Transform) stage 303, 304 and respective second FFT stage 305, 306 (e.g. implemented by a radar signal processing circuit 111). Based on the outputs of the FFT stages 303-306 the radar signal processing circuit 111 determines range information as well as velocity information (e.g. in form of a R/D (range/Doppler) map) for one or more objects in 307.

It should be noted that each second FFT stage 305, 306 outputs a two-dimensional FFT result (wherein one dimension corresponds to range and the other to velocity) for each antenna (e.g., based on the processing of the samples of the receive signal received by this specific antenna). The result of the first FFT stage 305 includes, for each receive antenna, a complex value for a range bin.

The FFT of the second FFT stage 306 goes over the result of the first FFT stage 305 over multiple chirps, for each range bin, generating, per range bin, a complex value for each Doppler bin. Thus, result of the second FFT stage 306 includes, for each receive antenna, a complex value for each combination of Doppler bin and range bin (i.e. for each Doppler/range bin). This can be seen to give an antenna-specific R/D map.

To generate an aggregate R/D map, the MMIC-specific R/D maps are combined together, e.g. by summing the up, for example by coherent or non-coherent integration. The velocity and range of specific objects may be estimated by identifying peaks in the R/D map, e.g. by means of a CFAR (Constant False Alarm Rate) algorithm. It should be noted that since an FFT output consists in general of complex values, a peak selection in an FFT output (such as the aggregate R/D map) may be understood as a selection based on absolute values (i.e. complex magnitudes of the complex outputs) or power (i.e. squares of absolute values).

In 308, the radar signal processing circuit 111 may further determine the direction of the one or more objects. This can be done based on the phase differences of the output values of the second stage FFT between different receive antennas.

Based on the results of this processing, further processing such as object classification, tracking, generation of an object list and decision-making (e.g. in autonomous driving) may be performed in 309 (e.g. by a further component such as a vehicle controller).

In the case of two MMIC 301, 302 the data cube which contains the digitized receive signals for all receive antennas is split into two parts, one for each MMIC 301, 302.

Figure 4:
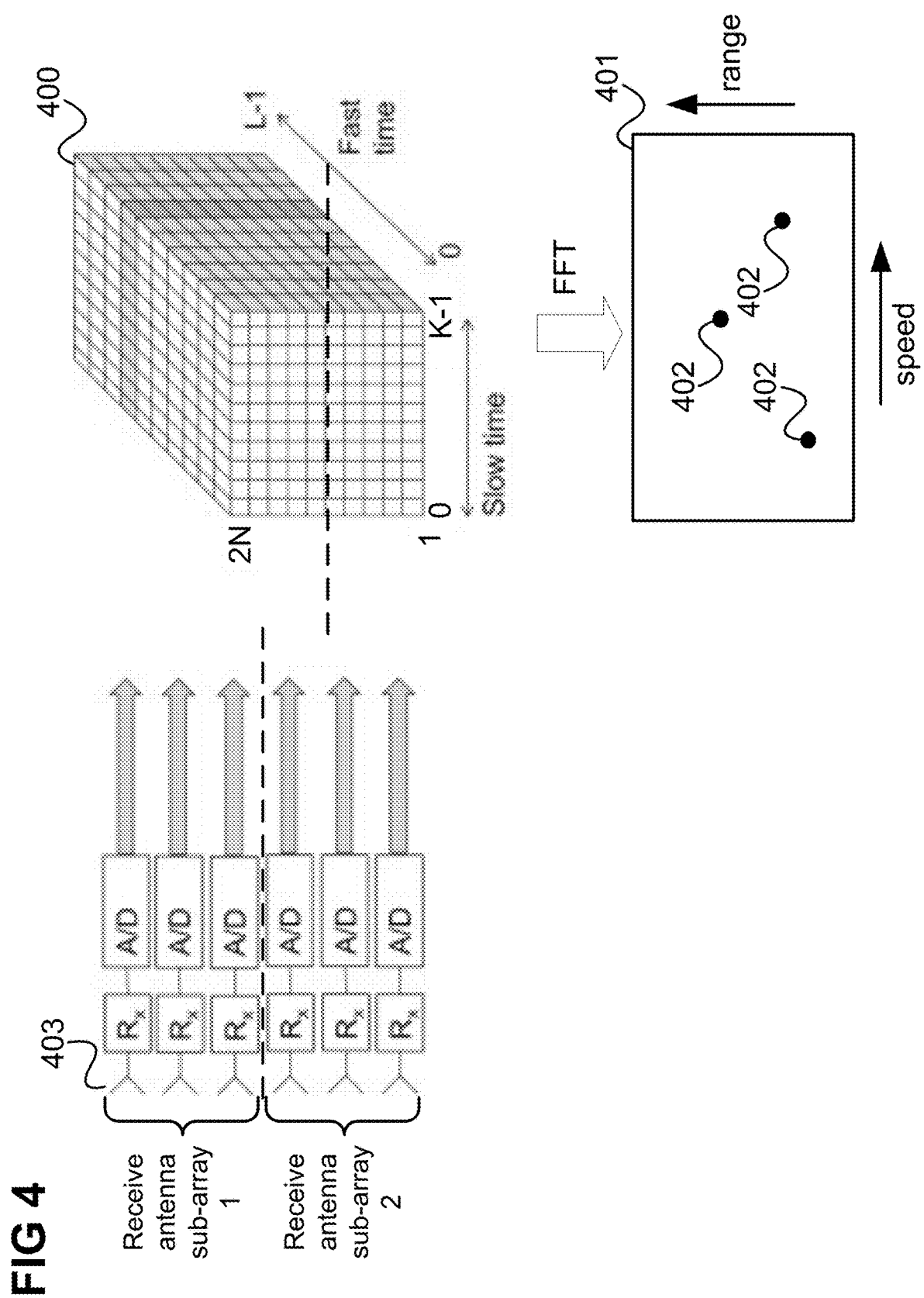
FIG. 4 shows an example data cube.

FIG. 4 shows an example data cube 400.

The data cube 400 includes digitized samples of receive signals from M antennas forming a receive antenna array 403 divided into two receive antenna sub-arrays. For example, the first MMIC 301 processes receive signals received by the first receive antenna sub-array and the second MMIC 302 processes receive signals received by the second receive antenna sub-array. In particular, the MMICs 301, 302 perform analog/digital conversion to generate the digitized samples.

For example, for each chirp (e.g. K=64 chirps), the received signal is sampled to have L samples (e.g. L=512).

The L samples collected for each chirp are processed by the respective first FFT stage 303, 304.

The first-stage FFT is performed for each chirp and each antenna, so that the result of the processing of the data cube 400 by the first FFT stage 303, 304 has again three-dimensions and may have the size of the data cube 400 but does no longer have values for L sampling times but instead values for L range bins. It should be noted that usually only the 0 to L/2 range bins are useful, as the spectrum of 1 st FFT is mirrored at L/2 and the second half may be discarded.

The result of the processing of the data cube 400 by the first FFT stage 303, 304 is then processed by the second FFT stage 305, 306 along the chirps (for each antenna and for each range bin).

The direction of the first-stage FFT is referred to as fast time, whereas the second-stage FFT direction is referred as slow time (direction of the chirps).

The result of the second-stage FFT gives, for each antenna, a range/Doppler map, which, when aggregated over the antennas (e.g. using NCI (non-coherent integration) to improve the signal-to-noise ratio and have higher probability of detection), results in a R/D map 401 which has FFT peaks 402 (i.e. peaks of FFT output values (in terms of absolute values) for certain range/speed combinations (i.e. for certain range/Doppler bins) which the radar signal processing circuit 111 expects to correspond to detected objects 108 (of a certain range and speed).

In practical application, phase errors between multiple cascaded MMICs 301, 302 add phase errors to the second stage FFT results between different antennas that cause a loss of angular precision or even a loss of sensitivity.

Reasons for phase errors between MMICs are given in the following with reference to FIG. 5.

Figure 5:
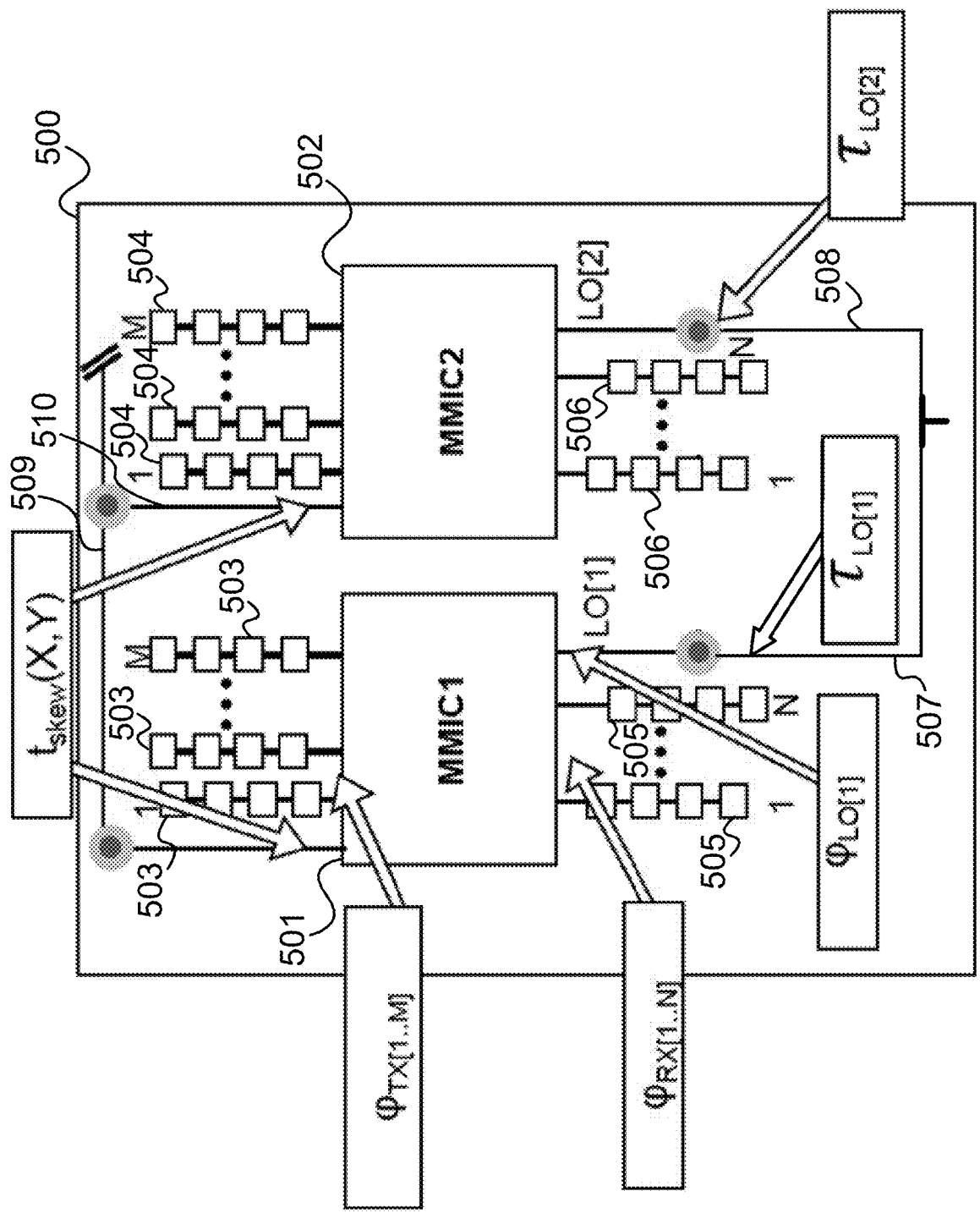
FIG. 5 shows an example printed circuit board including two MMICs.

FIG. 5 shows an example printed circuit board 500 including two MMICs 501, 502.

Each MMIC 501, 502 is coupled with M transmit antennas 503, 504 and N receive antennas 505, 506. For example N=M=4, i.e. each MMIC 501, 502 has four transmit channels and four receive channels.

The MMICs are provided with an oscillator signal (e.g. for frequency down conversion) from a local oscillator (LO; not shown) via a respective LO path and with an ADC clock from a clock generator (not shown) via a respective clock path 509, 510.

Phase errors between the MMICs 501, 502 may arise due to the following reasons.

1. Phase Drift between channels of the MMICs 501, 502
   Internal RF blocks of the MMIC 501, 502 have a temperature dependent behavior which changes the phases of the antennas ($\varphi_{TX[1\ldots M]}$, $\varphi_{RX[1\ldots N]}$) with respect to the local oscillator signal
2. Different time delays on LO paths 507, 508 between MMICs 501, 502 Different time delays T in the LO paths 507, 508 cause different offsets $\Delta f_{IF}$ for RX/TX combinations in beat frequency $f_{IF}$. The frequency offsets for the RX/TX combinations are denoted as $\Delta f_{IF\_RX\_TX}(T, \tau_{LO})$ Target reflections might occur on different range bins.
3. ADC clock skew between the MMICs 501, 502
   A constant ADC clock skew $t_{skew}(X,Y)$ between MMIC [X] and MMIC[Y] causes a range dependent phase shift of the IF signals $\Delta\varphi_{IF\_RX}(tskew)$
   If not considered in digital signal processing $\Delta\varphi_{IF\_RX}$ contributes to the total phase drift and thus effects the accuracy of angle estimation.

While delay differences of the LO paths 507, 508 between the MMICs 501, 502 can be reduced to minimum values by careful design and CAD (computer aided design) tools (e.g. by length matching when designing LO distribution to reduce phase error between MMICs), other delays (related to differences between MMIC dies) cannot be easily compensated.

Delay may be compensated focusing on time domain, at the level of ADC samples (e.g. at MMIC 301, 302 output level) or at alternative locations like first stage FFT 303, 304 output level or second stage FFT 305, 306 output level. This may be performed using compensation values pre-computed through calibration. However, pre-computed calibration values may not be valid for all condition, e.g. due temperature variation. In such a local compensation done in the life time of a radar device (e.g. a radar electronic control unit (ECU)) an error vector (i.e. one or more compensation values) may be determined based on measurements of temperature, voltage etc. However, this approach is limited in that it is based on knowledge of average silicon variations and does not account for outliers. This means with that with such a compensation, only a part of the error(s) can be compensated.

According to various embodiments, approaches for delay or phase error compensation are described allowing effective compensation. This, for example, includes performing phase correction (i.e. phase error correction) at a later stage than ADC sample level, when an FFT stage or multiple FFT stages have provided a gain (so, after 1st stage FFT 303, 304 of even after 2nd stage FFT 305, 306). Then, according to various embodiments, as having a reasonable gain, one or more FFT peaks (of the aggregate R/D map) are selected (e.g. by radar signal processing circuit 111) according to one or more relevance criteria such as:
- Criteria could be to ensure FFT peaks are from multiple parts of the range/Doppler map
- Criteria could be to select the one or more highest FFT peaks.

The radar signal processing circuit 111 then analyses the selected FFT peaks according to their class (for example per MMIC 301, 302 and for a given set of transmitters 104 or transmit antennas). The radar signal processing circuit 111 then uses this analysis to compute a correction factor between classes of FFT bins (e.g. containing FFT output values per MMIC 301, 302 (and for a given set of transmitters 104 or transmit antennas e.g. associated with the MMIC 301, 302)). The analysis can be done using a technique which may be implemented in software such as linear interpolation or using a neural network. The radar signal processing circuit 111 may then apply the correction factor to the detected peaks of the range/Doppler map or even all areas indicated by the range/Doppler map (e.g. to the second stage FFT output values in other areas of the range/Doppler map besides the FFT peak whose values have been used for computing the compensation value). When using a sequential activation of each transmit channel, the correction factor can also be applied after first stage FFT. In case the radar signal processing circuit 111 determines multiple correction factors, each for a respective FFT peak, it may average the correction factors to generate one average correction factor before applying it to other areas of the range/Doppler map.

Figure 6:
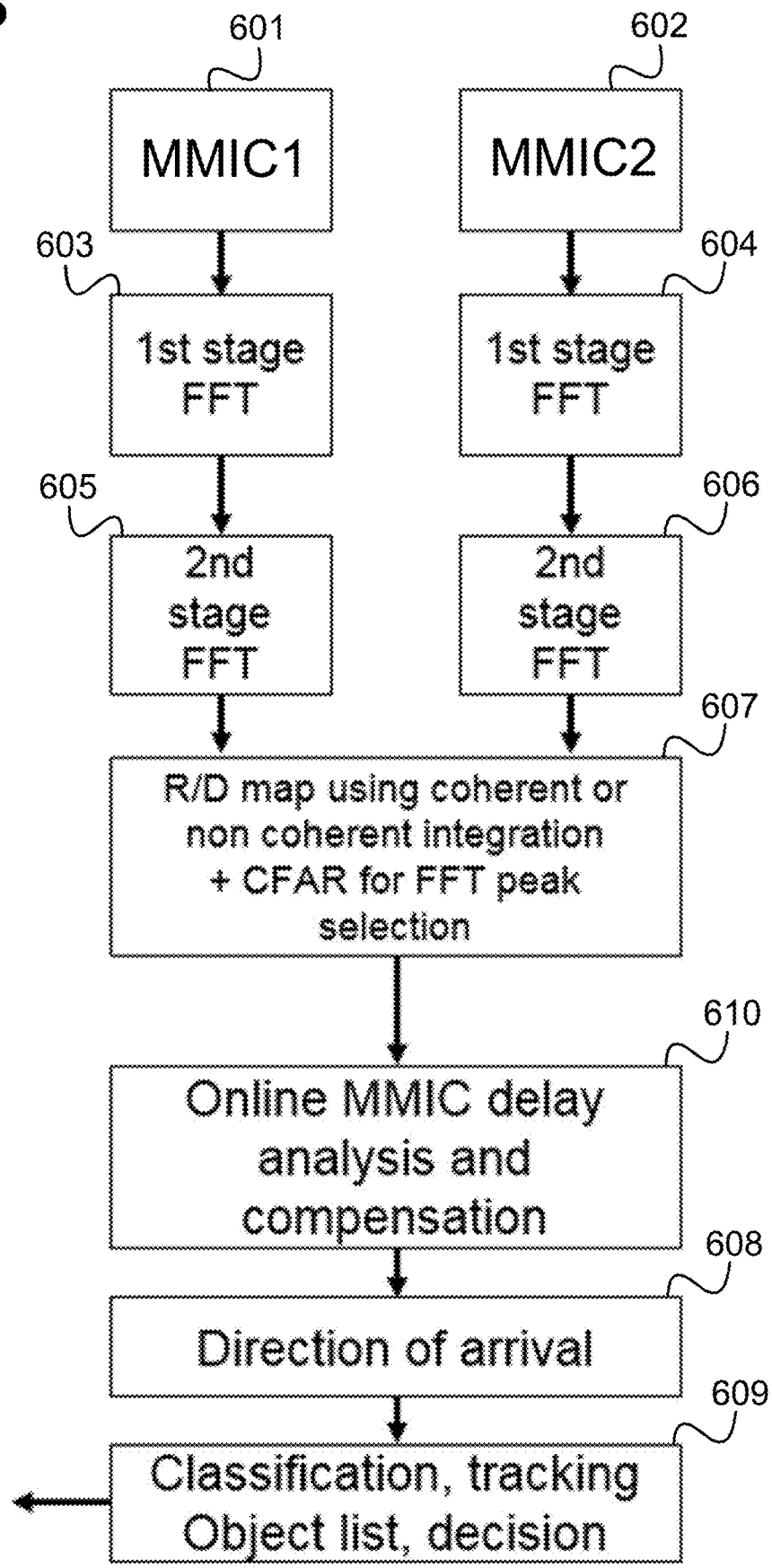
FIG. 6 illustrates an example of processing of radar receive signals using two MMICs including MMIC phase error compensation.

FIG. 6 illustrates an example of the processing of radar receive signals using two MMICs 601, 602 including MMIC phase error compensation.

Similarly to FIG. 3, the processing includes FFT stages 603-606, R/D map determination 607, direction of arrival determination 608 and further processing 609. In addition to the processing described with reference to FIG. 3, the processing of FIG. 6 further includes online MMIC delay analysis and compensation 610, i.e. phase error compensation for example as described above and in more detail below.

According to various embodiments, the phase difference Δφ between two MMICs 601, 602 is corrected as follows:
1) Compute aggregate range-Doppler map 401
2) Find FFT peaks 402 in range-Doppler map 401
3) Select strongest FFT peak 402. Get second stage FFT output for each receive antenna of the range/Doppler bin of the selected FFT peak. These values, referred to as "samples" in the following, of the strongest FFT peak 402 are used as reference for the compensation.
4) Find compensation value (phase shift), e.g. by
   a) Finding optimal line with least squares method-→phase shift between groups of samples (i.e. between samples of receive antennas of different MMICs)
   b) Utilizing other methods like a neural network, e.g. trained to find a compensation value for two sets of samples as input
5) Apply phase shift on other peaks 402 (i.e. on samples of other FFT peaks 402) as well In other words, according to various embodiments, information coming from the result of the processing of the reception signals done by the MMICs is used to compute an error vector. This error vector may then be applied to the result of the processing of further reception signals (in an open loop concept).

Figure 7:
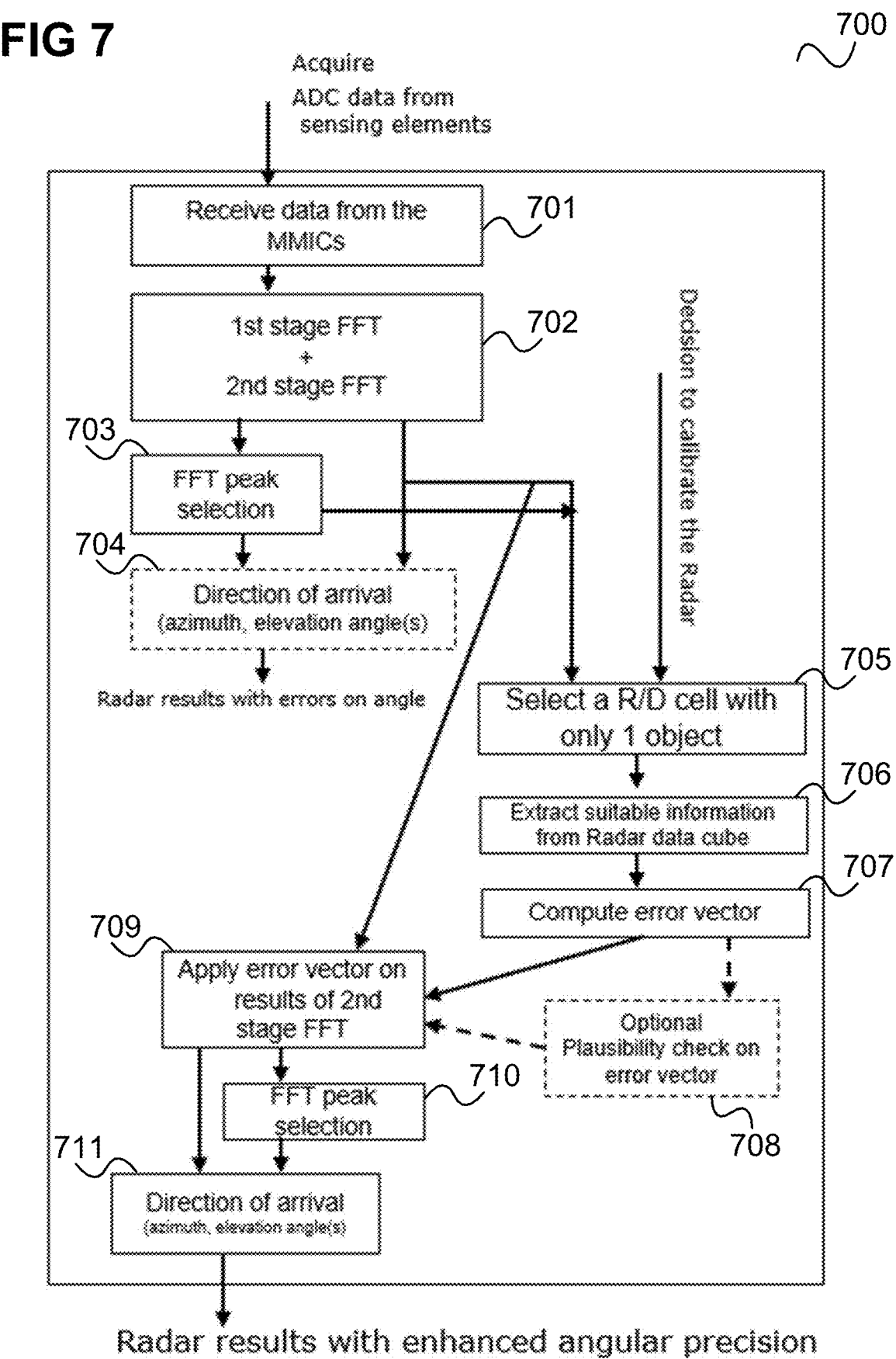
FIG. 7 shows a flow diagram illustrating an example of error compensation in a radar signal processing according to an embodiment.

FIG. 7 shows a flow diagram 700 illustrating an example error compensation in a radar signal processing according to an embodiment.

In 701, data is received from the MMICs.

In 702, first stage and second stage FFT are performed. An FFT peak is selected in 703 and direction of arrival determination may be performed in 704 (which may however be erroneous because no error compensation has been carried out).

If it is decided that the radar receiving system is to be calibrated an range/Doppler bin with only one object is selected in 705. In 706, data corresponding to the selected range/Doppler bin is acquired (e.g. second stage FFT output for each receive antenna of the selected range/Doppler bin) and an error vector is computed in 707. A plausibility check for the error vector may be performed in 708.

In 709, the determined error vector is applied to the results of the second stage FFT. Based on the second stage FFT results corrected in this manner, an FFT peak may be selected in 710 and direction of arrival determination may be performed in 711, leading to enhanced angular precision. It should be noted that that for modulation where Tx channels are only activated in a full sequential way, the error correction vector can be applied to first stage FFT results instead of the second stage FFT results.

Error compensation and normal acquisitions may be interleaved. This means that an error vector may be (e.g. periodically) determined using 701-703, 705-708 and in between the error vector determinations objects and their directions may be detected using the flow without error determination (but using the error vector for compensation according to its last determination) using 701, 702, 709-711.

Figure 10:
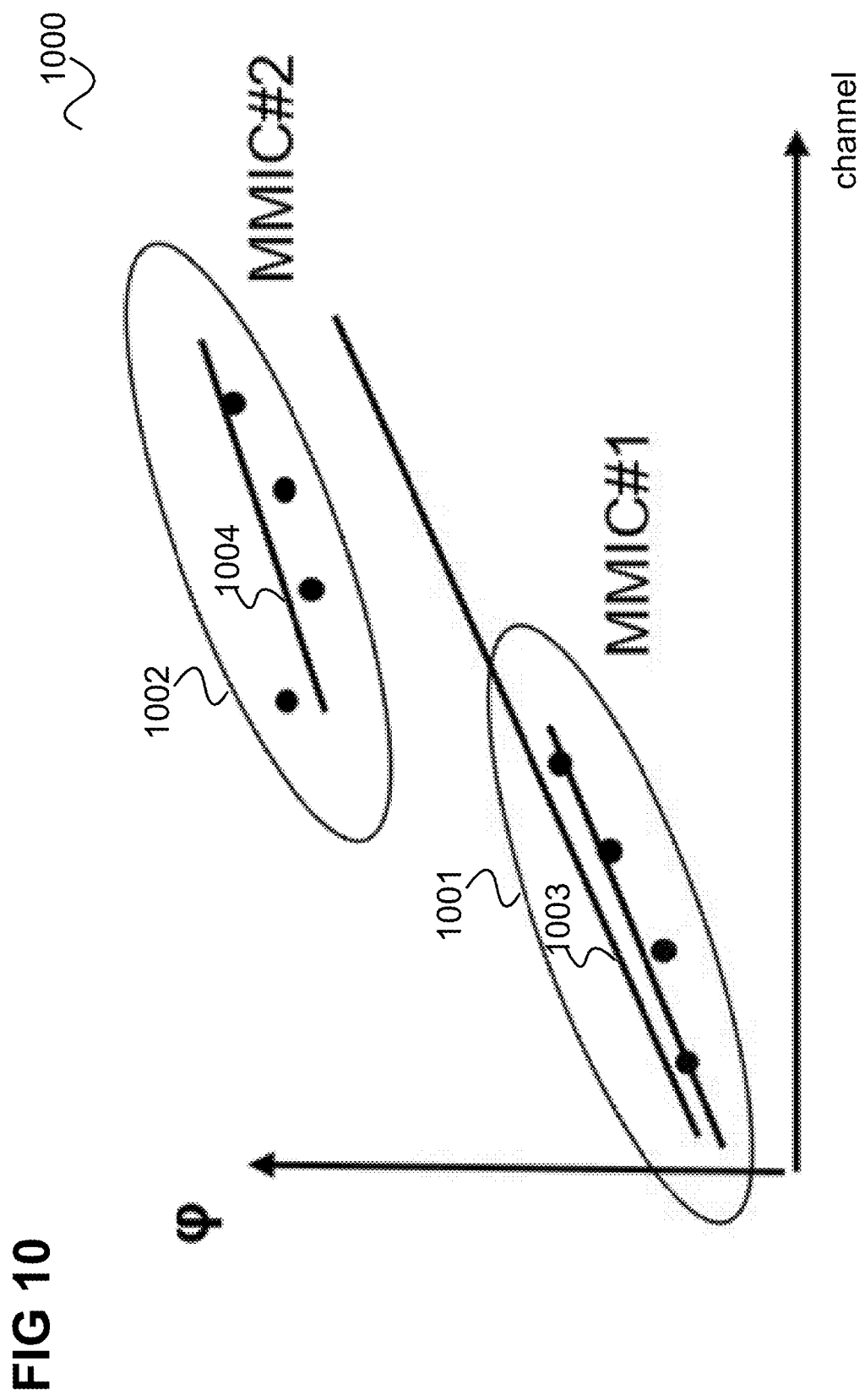
FIG. 10 shows a diagram illustrating an example of the relation between antenna number and phase as it may occur in practical application.

According to one embodiment, the processing of FIG. 7 is split over a plurality of devices, for example ECUs in a vehicle, as it is illustrated in FIG. 10.

Figure 8:
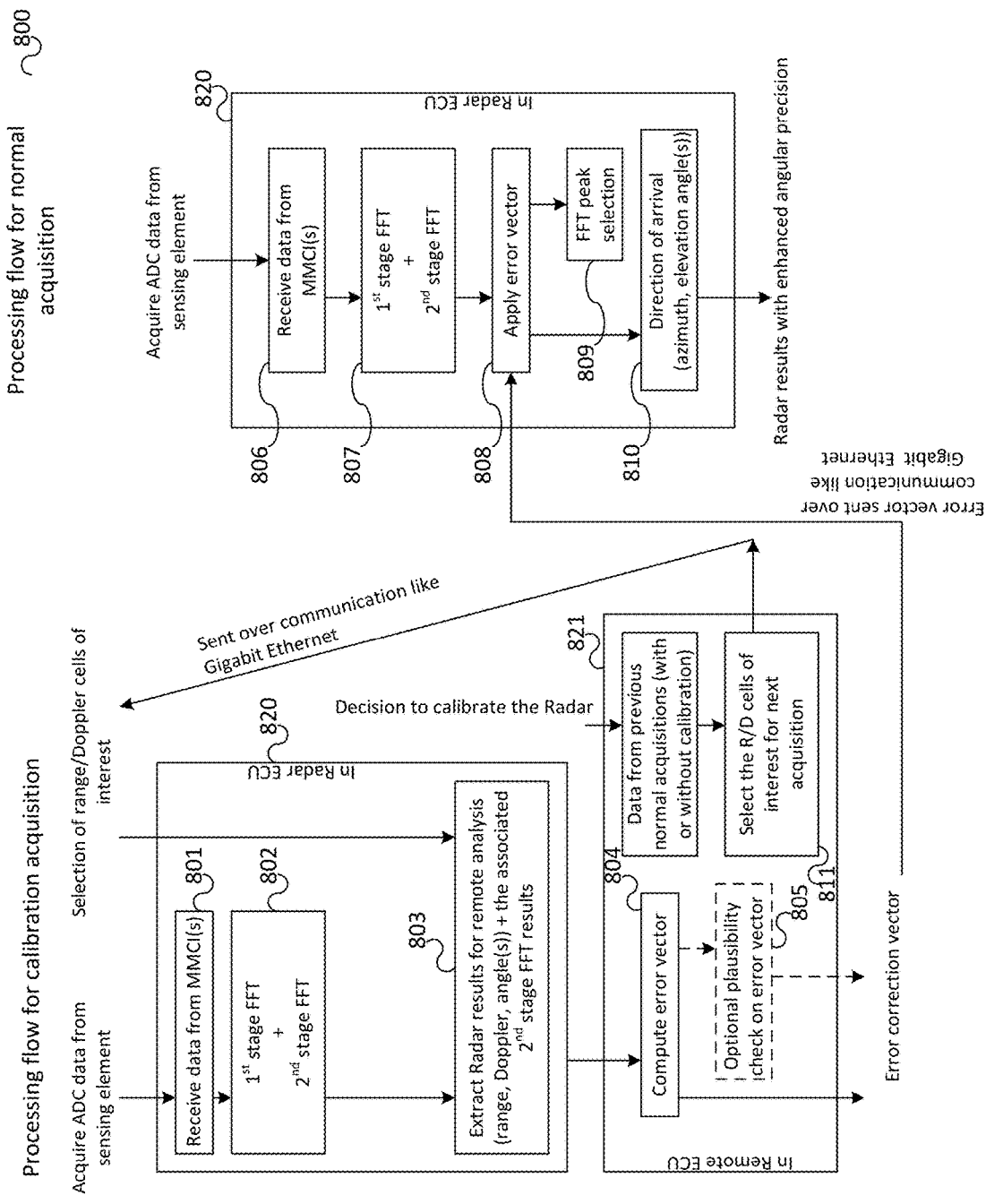
FIG. 8 shows a flow diagram illustrating an example of error compensation in a radar signal processing according to an embodiment, wherein the processing is distributed over multiple devices.

FIG. 8 shows a flow diagram 800 illustrating an example of error compensation in a radar signal processing according to an embodiment, wherein the processing is distributed over multiple devices.

In 801, a first radar ECU 820 receives data from the MMICs.

In 802, the first radar ECU 820 performs first stage and second stage FFT.

In 803, the first radar ECU 820 extracts the results of the processing performed by the first radar ECU 820 which is required to compute an error vector and sends it to a second radar ECU 821.

In 804, the second ECU 821, if it is decided that the radar should be calibrated, i.e. an error vector should be calculated, computes an error vector for which it optionally performs a plausibility check in 805. The second ECU may use the data from the current "calibration acquisition" (i.e. the data provided by the first ECU 820 in 803) for the computation of the error vector but may also use data from earlier normal acquisitions. The second ECU 821 may also selected R/D bins (also denoted as R/D cells) of interest for a next acquisition in 811, e.g. may request data (e.g. 2nd stage FFT results) from the first radar ECU 820 for those R/D bins The second ECU 821 provides the error vector to the first ECU 820, which, for normal acquisitions, performs processing 806 to 810 similar to 701, 702, 709, 710, 711.

In the following, an approach for finding a compensation based on least squares is described. It is assumed that there are two MMICs (MMIC #1 and MMIC #2) which each serves four receive antennas, i.e. there is a sample group of four samples (second-stage FFT output value) for each MMIC. Thus, in total one sample for each of the eight antennas served by the two MMICs.

Figure 9:
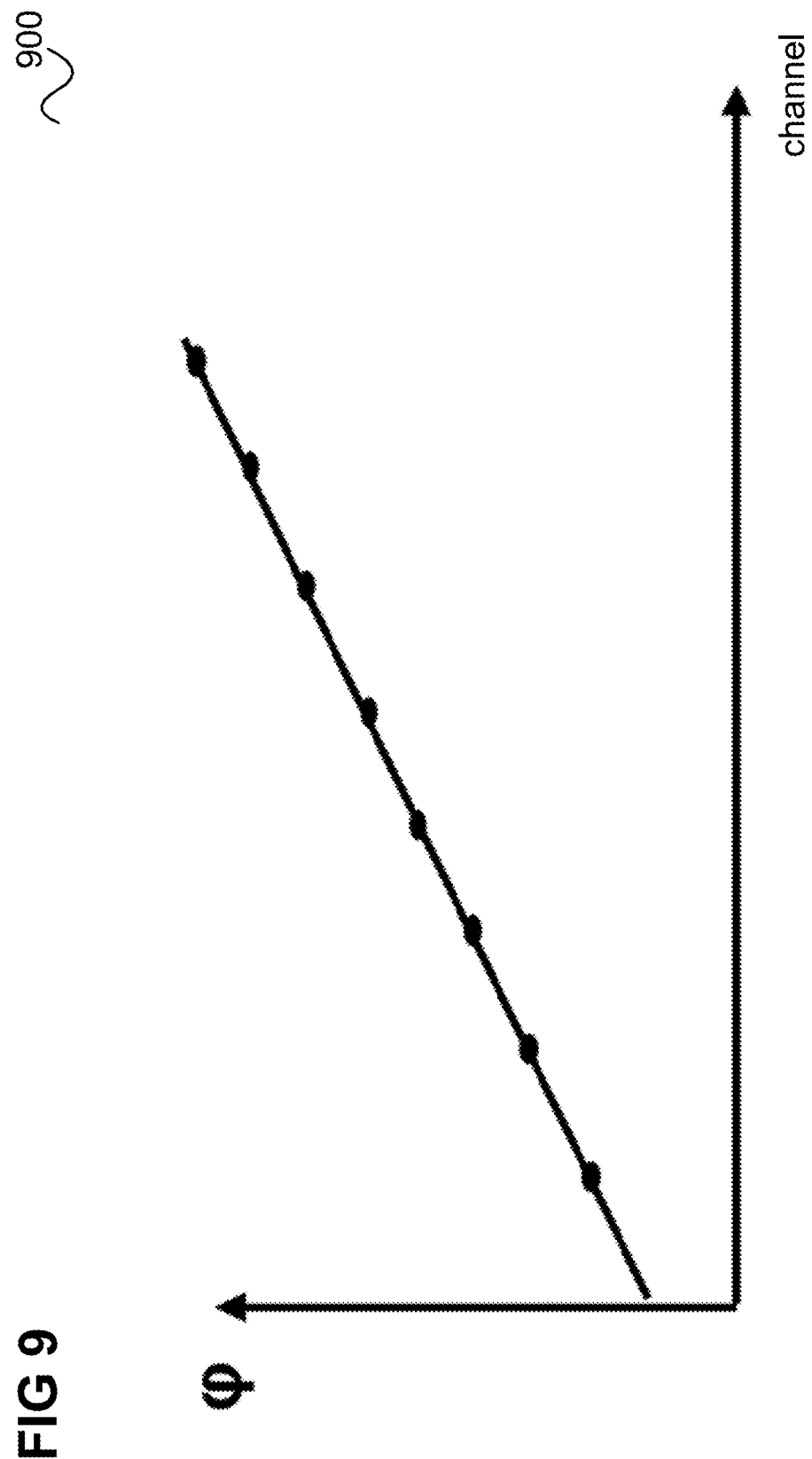
FIG. 9 shows a diagram illustrating the ideal relation between antenna number (or number of Rx channel, indicated along the x-axis) and phase (indicated along the y-axis).

FIG. 9 shows a diagram 900 illustrating the ideal relation between antenna number (or number of Rx channel, indicated along the x-axis) and phase (indicated along the y-axis).

The ideal relation is that the phase various linearly over the receive antenna array (according to the direction the object 108 has with respect to the antenna arrangement 102). It should be noted that it is assumed that the antennas are numbered in the order as they are arranged in the antenna array. For example, for the antenna array of FIG. 4 the numbering could be 1 to 7 from bottom to top or in the example of FIG. 5 numbered 1, 2, ..., N, N+1, 2N from left to right (wherein e.g. N=4).

FIG. 10 shows a diagram 1000 illustrating an example of the relation between antenna number and phase as it may occur in practical application.

It is assumed that first four samples (from left to right) forming a first sample group 1001 belong to the receive antennas served by MMIC #1 and the fifth to eighth samples forming a second sample group 1002 belong to receive antennas served by MMIC #2. As illustrated by lines 1003, 1004, there is an almost linear relation between phase and antenna number within each sample group 1001, 1002. However, between the sample groups 1001, 1002, there is a discontinuity due to a phase error between the MMICs.

Figure 11:
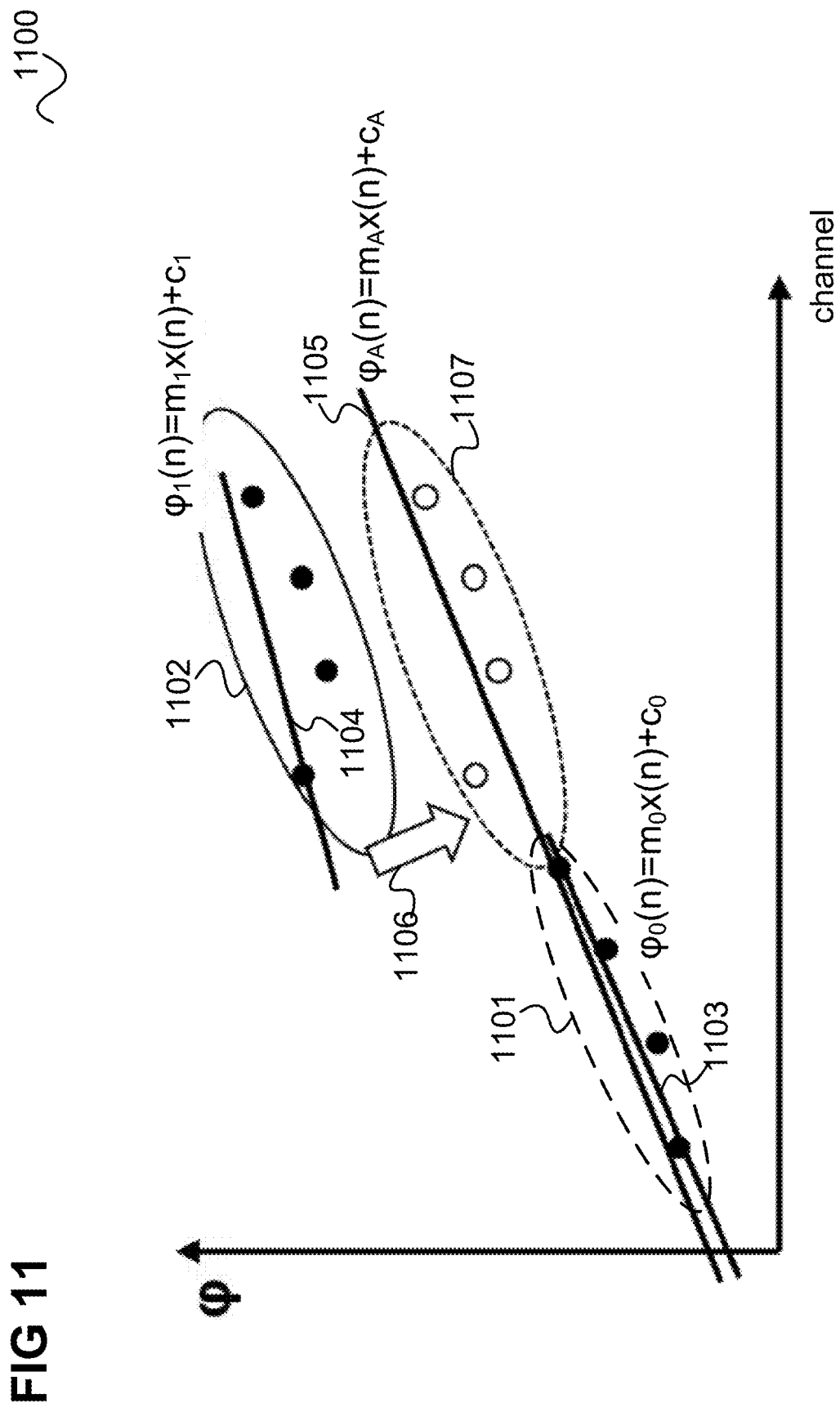
FIG. 11 shows a diagram illustrating an example of compensation of the phase error between the MMICs.

FIG. 11 shows a diagram 1100 illustrating an example of the compensation of the phase error between the MMICs.

As in FIG. 10, a first line 1103 gives the relation between the samples of the first sample group 1101 and a second line 1104 gives the relation between the samples of the second sample group 1102.

The signal processing circuit 111 may find the lines 1103, 1104 by performing line fitting for the two sample groups 1101, 1102.

The first line 1103 is assumed to be given by $$\varphi_0(n) = m_0 \cdot x(n) + c_0$$

and the second line 1104 is assumed to be given by $$\varphi_1(n) = m_1 \cdot x(n) + c_1$$

where n is the antenna number, x(n) is the physical position of the antenna n, and m0, m1, c0, c1 are constants. The antenna may be positioned with uniform spacing between each other or with non-uniform spacing (sparse arrangement) between each other.

According to the ideal linear relationship (as illustrated in FIG. 9), the relation between phase and antenna number should be given by a single line 1105

$$\varphi_A(n) = m_A \cdot x(n) + c_a$$

defined by constants $m_A$ and $c_A$.

According to one embodiment, the signal processing circuit 111 finds an mA such that $$sqErr = (m0 - mA)2 + (m1 - mA)2$$

is minimum.

Let the phases of the samples be denoted by $\varphi(n)$ with n=0 ... (R−1) for MMIC #1 (1st group) and n=R ... (R+S−1) for MMIC #2 (2nd group).

Here, R is the number of channels in the 1st group 1001 and S is the number of channels in $2^{nd}$ group 1002. For example, R=S=4, then n=0 ... 3, 4 ... 7.

The signal processing circuit 111 may find mA by iterating for k=0 ... (K−1) sqErr[k]=(m0−mA[k])2+(m1−mA[k])2 wherein mA [k] is the slope obtained (e.g. by linear line fitting) for the phases $$\varphi_A(n) = \varphi_0(n) \text{ when } n = 0 \ldots 3$$

$$\varphi_A(n) = \varphi_1(n) - P[k] \text{ when } n = 4 \ldots 7$$

and P[k] are trial values created around $(c_0 - c_1)$.

For example, $$-G^*(c_0 - c_1) \le P[k] \le G^*(c_0 - c_1),$$

where G may be suitably chosen, e.g. G=4.

There is a P[k*] with minimum sqErr[k*] among the P[k]s of all K iterations. Since this is not necessarily the best compensation value, this may be further optimized e.g. by parabolic optimization. This means that the created points (P[k], sqErr[k]) may be interpolated, e.g. using a parabolic function, and the minimum sqErrmin with corresponding Pmin may be located.

Figure 12:
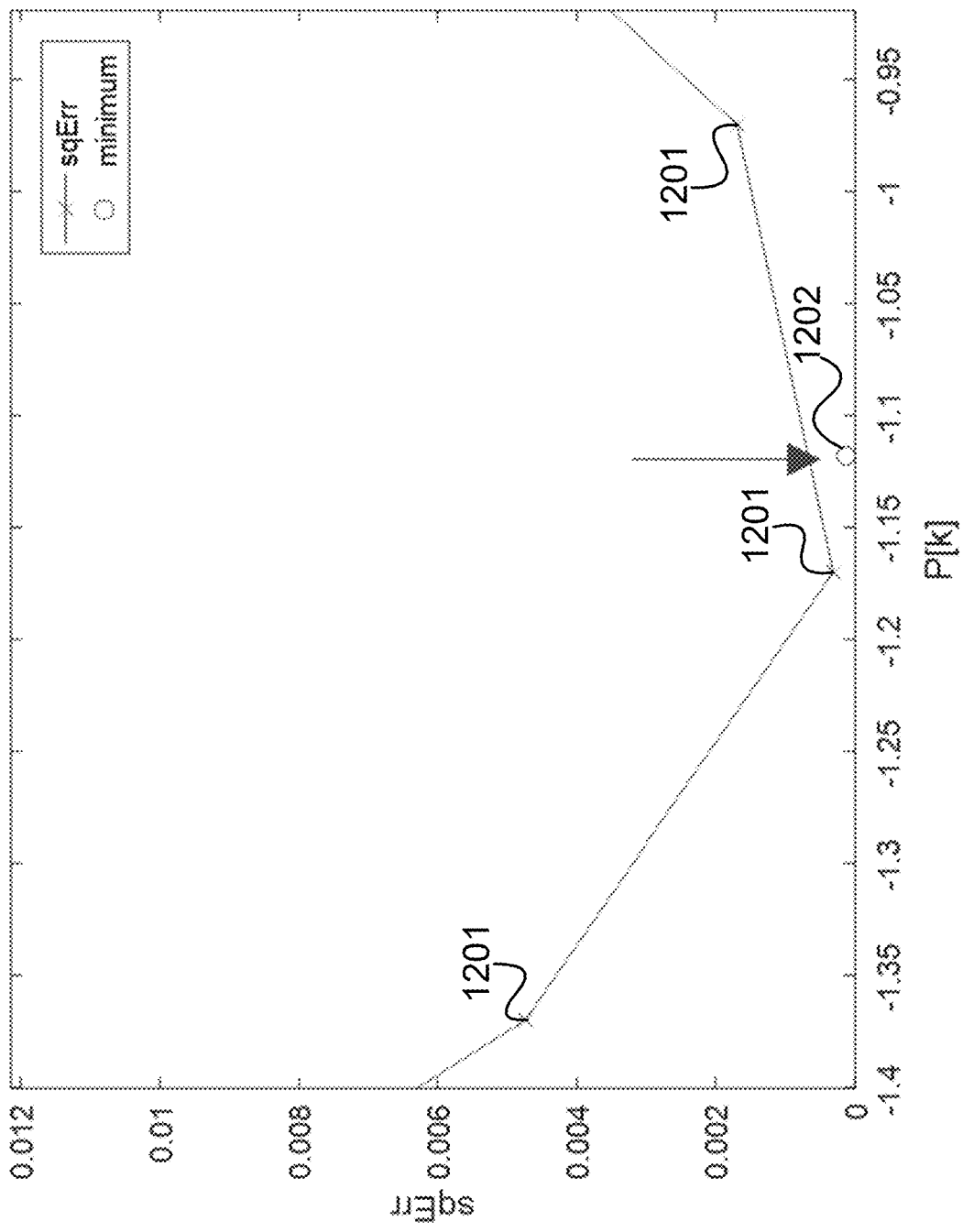
FIG. 12 illustrates an example of performance of different phase compensation values.

FIG. 12 shows the squared error sqErr[k] for various values of P[k] (indicated as pairs 1201 of P[k] and sqErr[k]). The unknown best compensation value 1202 (with minimum sqErr) does not correspond to any of the P[k].

Figure 13:
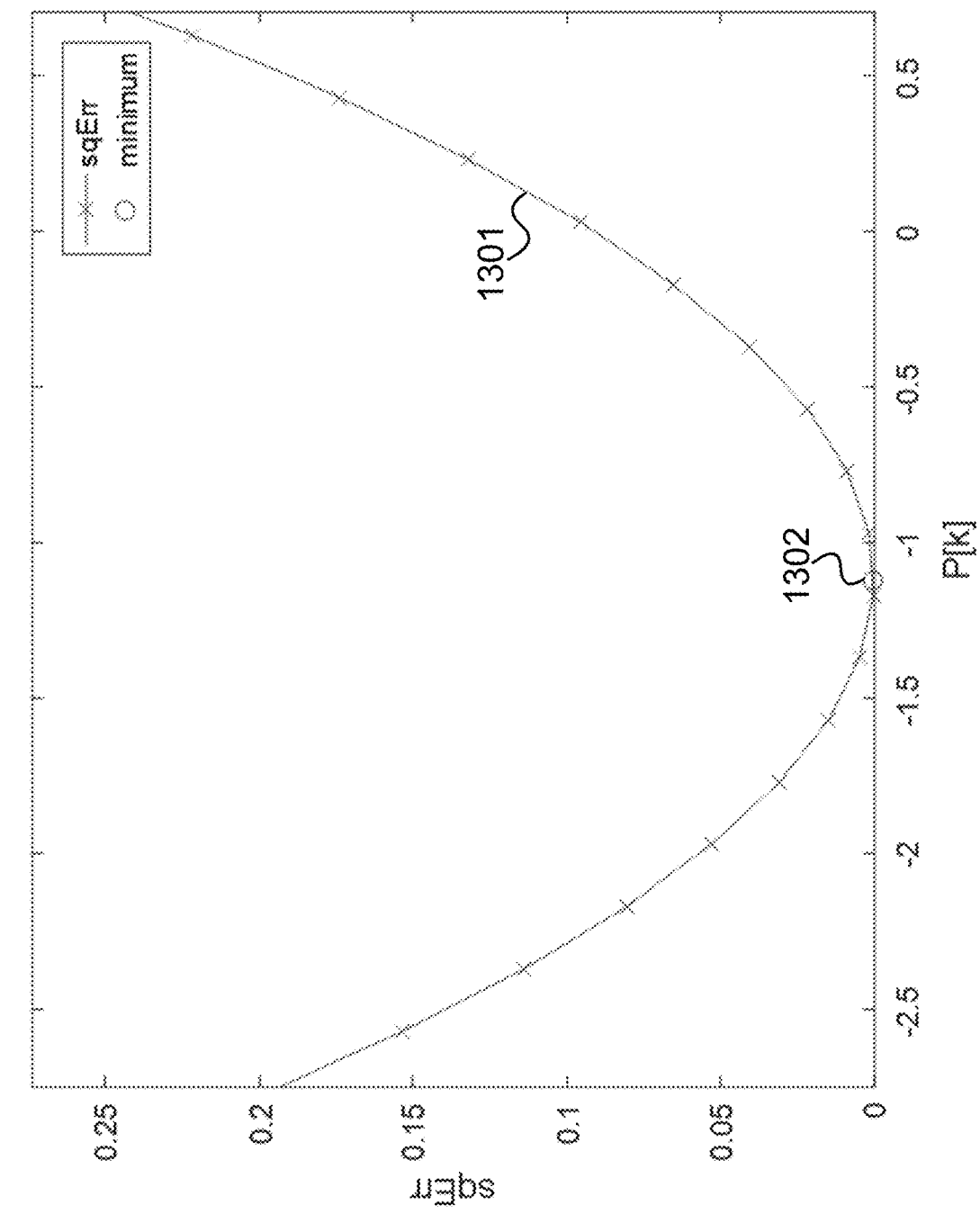
FIG. 13 illustrates an example of parabolic interpolation to determine the best compensation value.

FIG. 13 illustrates an example of parabolic interpolation used to determine (or at least estimate) the best compensation value. Pairs of P[k] and sqErr[k] are interpolated by a parabola 1301 whose minimum 1302 may be determined to determine the best compensation value (with minimum sqErr).

By compensating the second group of samples 1102 according to the best compensation value (as indicated by arrow 1106), the first group of samples 1101 and the compensated second group of samples 1107 fit a common (e.g., joint) relationship given by the line 1105. It should be noted that both groups 1101, 1102 may be compensated to fit a common relationship, e.g. given by a line lying between the first line 1103 and the second line 1104.

It should be noted that in FIG. 11, instead of using the index n in the linear models, the more general term x(n) is used which denotes the position of the n-th antenna (e.g. on a printed circuit board). This is because the approaches described herein may also be used for sparse array as illustrated in FIGS. 14 to 16.

Figure 14:
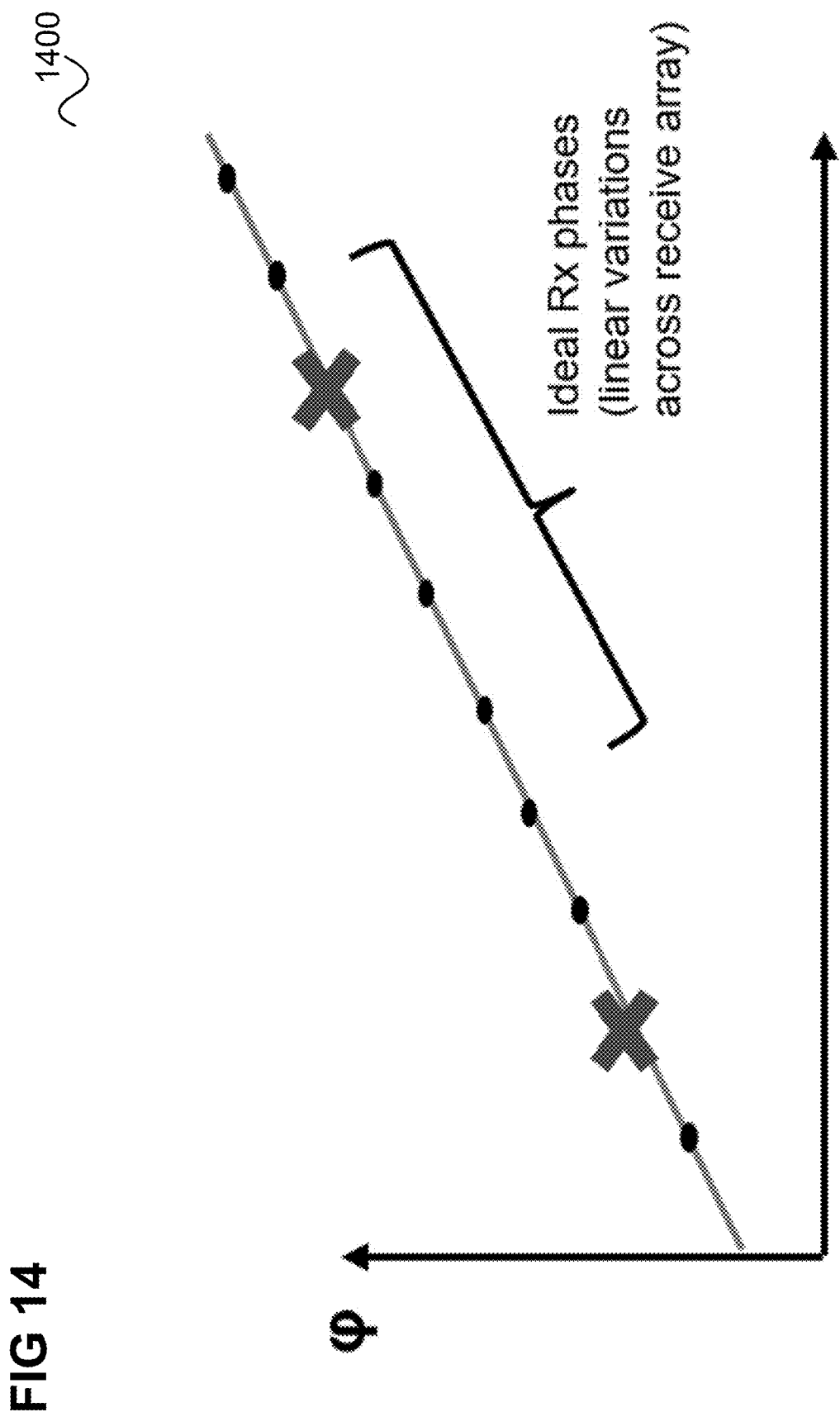
FIG. 14 shows a diagram illustrating the ideal relation between antenna position and phase for a sparse antenna array.

FIG. 14 shows a diagram 1400 illustrating the ideal relation between antenna position (or number of Rx channel, indicated along the x-axis) and phase (indicated along the y-axis) for a sparse antenna array. As indicated by the crosses, some antenna positions are unoccupied (i.e. some antennas are omitted, e.g. to extend the aperture of the radar).

Figure 15:
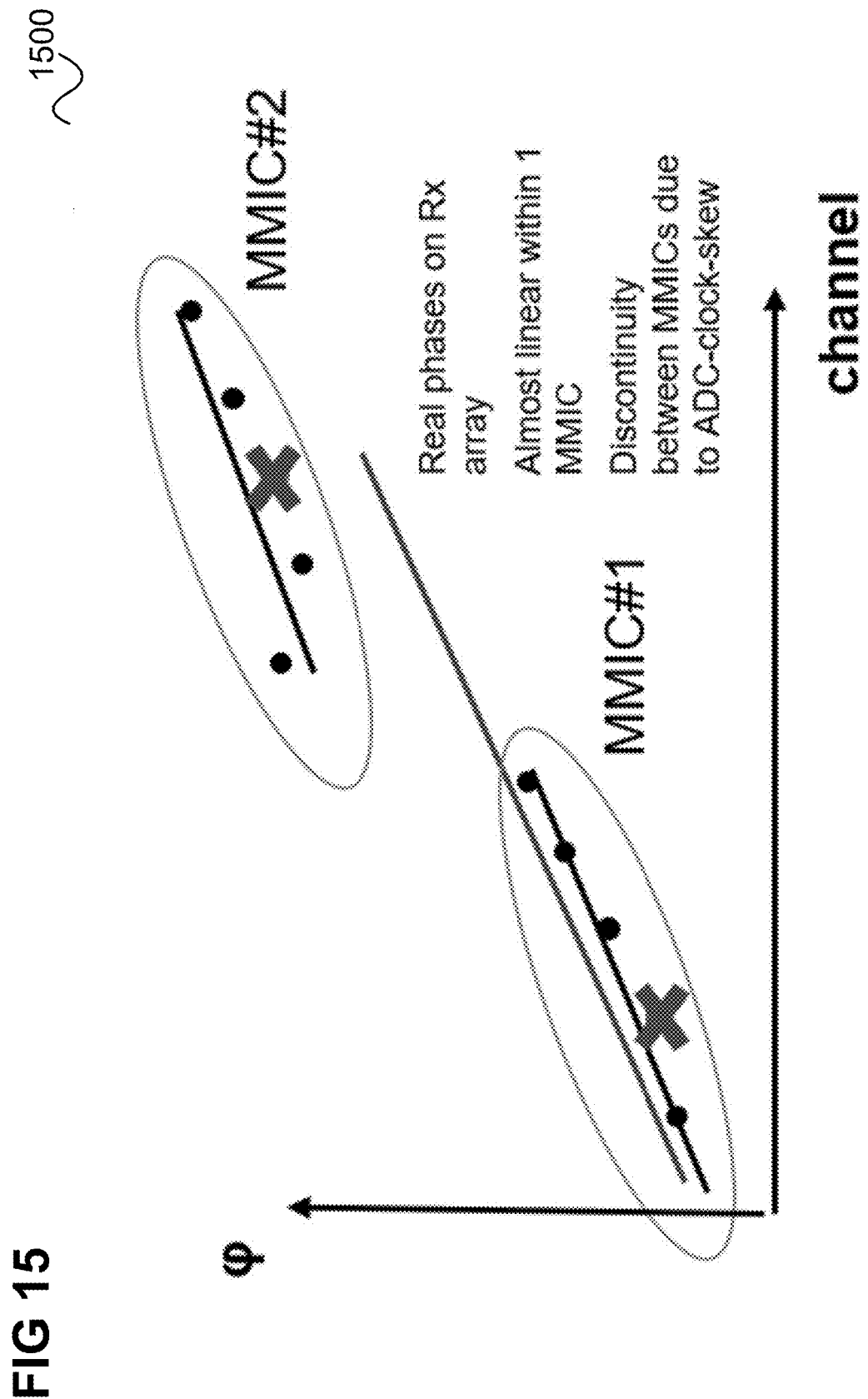
FIG. 15 shows a diagram illustrating an example of the relation between antenna number and phase as it may occur in practical application for a sparse antenna array.

FIG. 15 shows a diagram 1500 illustrating an example of the relation between antenna number and phase as it may occur in practical application for a sparse antenna array. Corresponding to FIG. 14, as indicated by the crosses, some antenna positions are unoccupied.

Figure 16:
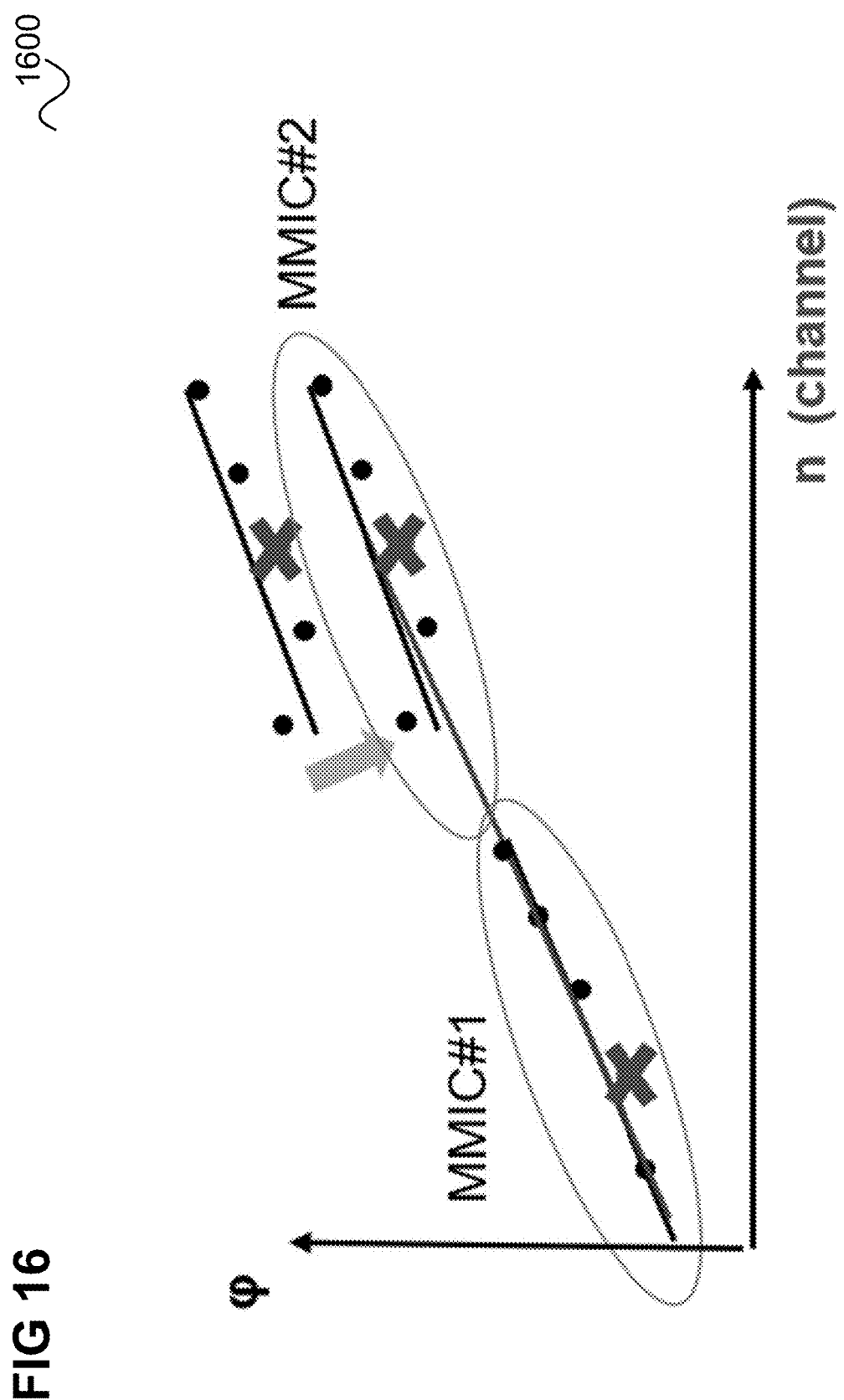
FIG. 16 shows a diagram illustrating an example of compensation of the phase error between the MMICs for a sparse antenna array.

FIG. 16 shows a diagram 1600 illustrating an example of compensation of the phase error between the MMICs for a sparse antenna array. Corresponding to FIGS. 14 and 15, as indicated by the crosses, some antenna positions are unoccupied.

Figure 17:
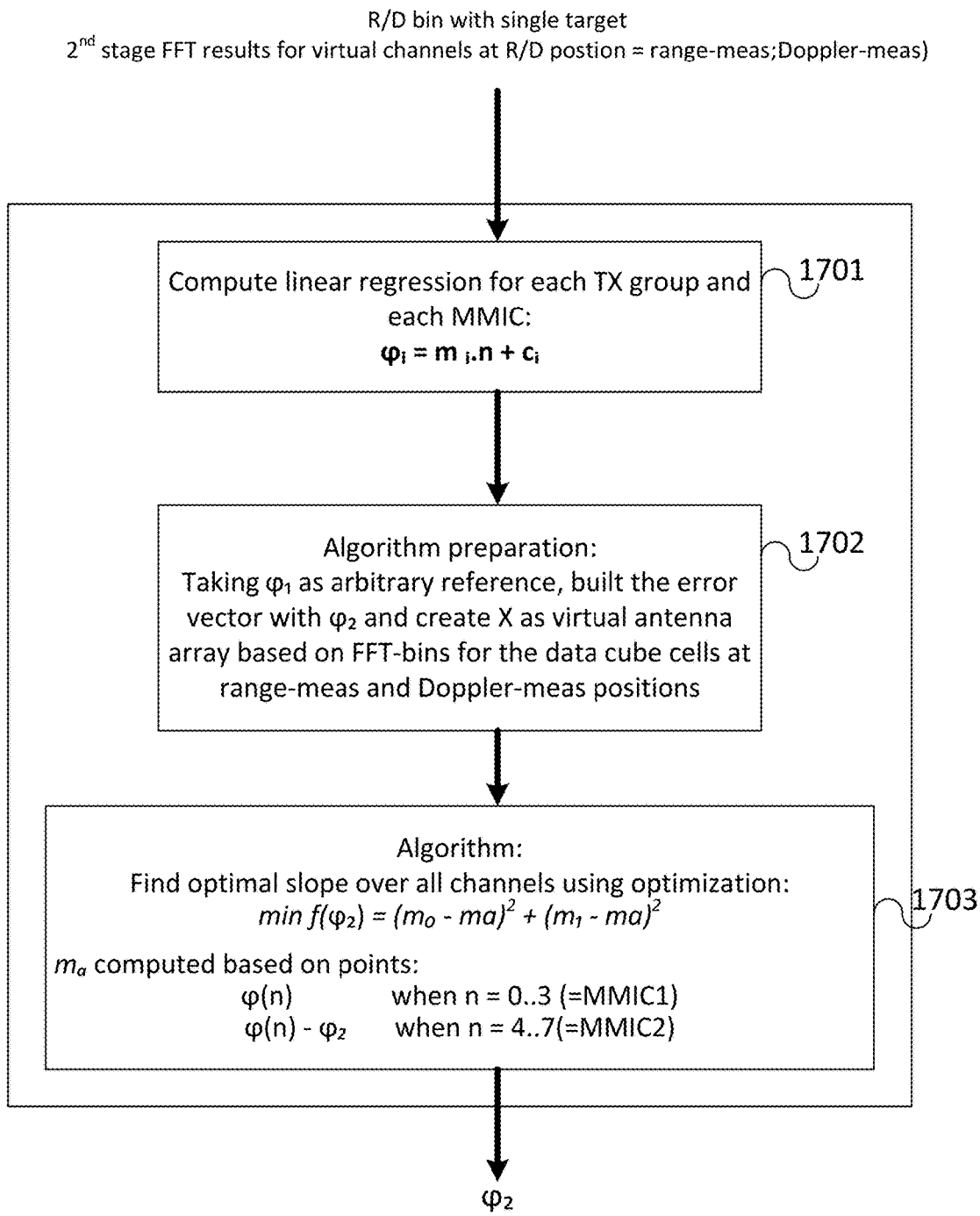
FIG. 17 shows a flow diagram illustrating an example for the calculation of a compensation value.

FIG. 17 shows a flow diagram 1700 illustrating an example for the calculation of a compensation value.

Only azimuth compensations are performed (but the same concept applies for elevation).

In this example, it is assumed that there are 2 MMICs, each having one transmitter and four receivers active. So, there are 2×4 virtual channels. So, the input vector X for the compensation is a vector with eight elements, each being a complex value.

In 1701, linear regression is performed for each MMIC to have a phase value pi for each MMIC (i=1, 2).

Taking $\varphi 1$ as reference phase value, a compensation to apply on the phase value $\varphi 2$ for the transmitter of MMIC #2 is to be computed.

In 1702, the relevant data is collected and in 1703 a slope mA for a linear model covering the sample groups of both MMICs is determined For more accurate calibration, the error can be computed on several FFT peaks and an average of multiple can be taken.

Having found an estimated best compensation value the radar signal processing circuit 111 may compensate other samples (i.e. second stage FFT outputs of range/Doppler bins other than those belonging to the strongest FFT peak) using the compensation value.

The above approach for finding a compensation value is only an example and more complex approaches, including neural networks, may be used. It should be noted that with the processing capabilities of next generation radar signal processing circuits, complex algorithms may be supported.

When there is a single object in one range-Doppler bin, the situation is ideal since the sample groups 1001, 1002 will each lie (approximately) on a respective straight line (even if there is a phase shift between the sample groups and thus a shift between the two lines). In case that there are more objects in one range-Doppler bin, the samples within the sample groups 1001, 1002 are typically more scattered. Still, a line (i.e. linear model) can be found for each sample group 1001, 1002 and the above approach can be similarly applied to find the shift between the lines (and thus the compensation value). For this, more complex mathematics may be used, e.g. to find the linear model for a sample group.

Similarly, it should be noted that the while in the above, the compensation is shown for a single transmitter, similar and more complex mathematics may be applied for computing a compensation value (or error vector) over a virtual array formed by more than one transmitter channel.

It should further be noted that the above approaches to determine and compensate phase errors between MMICs may be combined with approaches to reduce phase errors between MMICs (to minimize difference between MMIC phases and thus facilitate phase error compensation). One example for such an approach are pre-acquisition ramps: because some of the delays that should be compensated are related to junction temperature, dummy preacquisition ramps may be used. These are ramps done before the real acquisition ramps in order to warm-up the dies before the acquisition of receive signals starts. They may be ramps performed before the real acquisition ramps with a different TX modulation scheme just to warm all dices rapidly while ensuring the transmitted spectrum remains within regulation envelop. Multiple transmitters may be activated concurrently with the same modulation that is not done normally because it prevents demodulation.

It should further be noted that the phase error compensation (or delay compensation) may be done inside a Radar ECU (electronic control unit) or outside the Radar ECU by sending only the data of virtual channels for the selected peaks. Further, approaches for delay compensation for example for antenna related delays (such as pre-calibration) may be combined with compensation of MMIC related compensation as described above.

While the above examples have been described in context of FMCW radar, the approaches described herein may similarly be applied to PMCW (phase modulated continuous-wave) radar.

Figure 18:
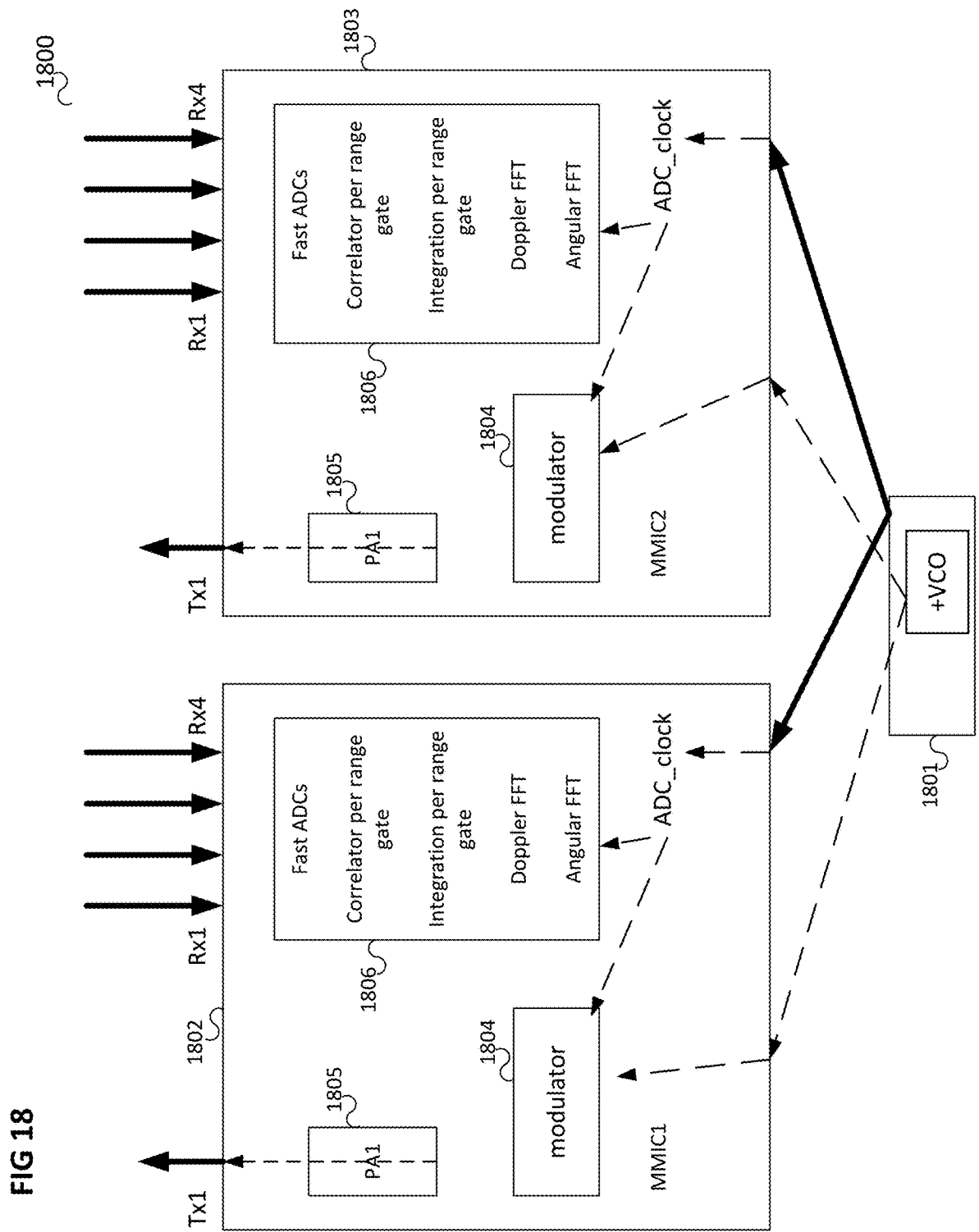
FIG. 18 shows an example PMCW (phase modulated continuous-wave) radar device.

FIG. 18 shows an example PMCW radar device 1800.

An oscillator 1801 provides oscillation signals to a first MMIC 1802 a second MMIC 1803. Each MMIC 1802, 1803 has a transmit path (including a respective modulator 1804 and a respective amplifier 1805) and receives reception signals via multiple receive antennas. The reception signals are processed by a respective radar signal processing circuit 1806. In this example the radar signal processing circuits are shown completely within the MMICs 1802, 1803 but at least a part of them (e.g. circuits for performing FFTs) may be external to the MMICs 1802, 1803.

As in the case of FMCW radar, cascaded MMICs of a PMCW radar device (or system) exhibit angular errors, since differential phase errors between the oscillation signals for the modulators 1804 and between the ADC clocks (clock skew error) leads to angular errors. These may be compensated as described above for FMCW. The same applies to OFDM radar.

Figure 19:
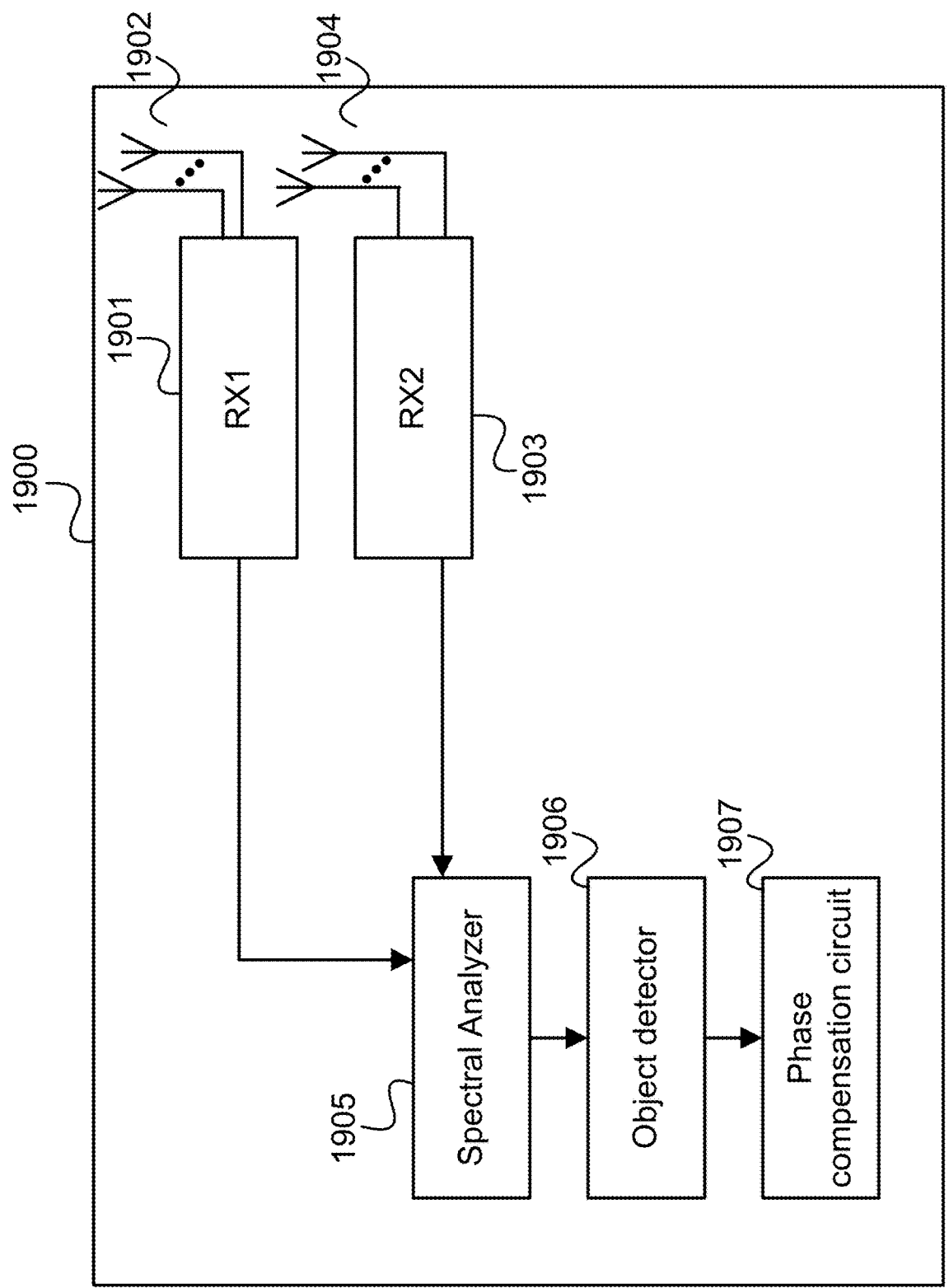
FIG. 19 shows an example radar receiving system according to an embodiment.

In summary, according to various embodiments, a radar receiving system is provided as illustrated in FIG. 19.

FIG. 19 shows an example radar receiving system 1900 according to an embodiment.

The radar receiving system 1900 is for example mounted in a vehicle and configured for radar operation, in particular when the vehicle is moving.

The radar receiving system 1900 includes a first receiving circuit 1901 including a first plurality of antennas 1902 and configured to receive a first plurality of reception signals via the first plurality of antennas 1902.

The radar receiving system 1900 further includes a second receiving circuit 1903 including a second plurality of antennas 1904 and configured to receive a second plurality of reception signals via the second plurality of antennas 1904.

According to one embodiment, the first plurality of antennas 1902 and the second plurality of antennas 1904 are organized in a coherent array.

Further, the radar receiving system 1900 includes a spectral analyzer 1905 configured to generate, from the first plurality of reception signals, a first set of Fourier transformation output values including Fourier transformation output values assigned to each of a plurality of range/Doppler bins and, from the second plurality of reception signals, a second set of Fourier transformation output values including Fourier transformation output values assigned to each of the plurality of range/Doppler bins.

The radar receiving system 1900 further includes an object detector 1906 configured to determine a range/Doppler bin of the plurality of range/Doppler bins as an estimate of a range and speed of an object from the first set of Fourier transformation output values and the second set of Fourier transformation output values.

The radar receiving system 1900 further includes a phase compensation circuit 1907 configured to determine a phase offset between the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate and to compensate the phases of at least a part of the second set of Fourier transformation output values by the determined phase offset.

According to various embodiments, in other words, a spectral values for a range/Doppler map are generated by processing of reception signals by two stages of (discrete) Fourier transformations (preceded by other processing e.g. amplification, frequency-down conversion, analog-to-digital conversion). At least one reference range/Doppler bin is selected (corresponding to an estimate of range and velocity of an object, e.g. by peak selection in the range/Doppler map) and the phase error between the spectral values of the reference range/Doppler bin coming from a first set of antennas (i.e. determined by processing of reception signals received by the first set of antennas) and the reference range/Doppler bin coming from a second set of antennas are compensated. The corresponding phase compensation value (i.e. the phase offset determined for this compensation) may then be used for phase compensation of spectral values of other range/Doppler bins. For example, the phase offset may be determined for the spectral values coming from the second set of antennas of the reference range/Doppler bin and may after its determination be applied for compensation of spectral values coming from the second set of antennas of other range/Doppler bins (e.g. other peaks of the range/Doppler map). It should be noted that thus, in particular, values coming from analog-to-digital conversion of received radar signals (possibly already mixed and/or filtered) are used as a basis for the error compensation.

The first receiving circuit 1901 and the second receiving circuit 1902 are for example (at least partially) implemented by a respective MMIC. However, each receiving circuit 1901, 1902 may also include multiple MMICs and/or there may be more than two receiving circuits 1901, 1902, each being implement (or including) one or more MMICs. Each MMIC may have a plurality of receive channels (e.g. four but embodiments are not limited to this number). The approach of FIG. 19 thus allows compensating errors between MMICs. The compensation allows then to have higher angular accuracy when using the Fourier transformation output values for direction of arrival determination. Since the determination of the phase offset operates (only) on the Fourier transformation output values for the determined range/Doppler bin, the amount of data to be considered for the phase offset determination is relatively low (compared to, e.g. using all reception signal samples at ADC output) and can thus be efficiently implemented. In particular, this allows online phase error compensation, i.e. phase error compensation while the radar receiving system is in use, e.g. in a vehicle. This allows adapting to changing situations (e.g. temperature changes which may result in changed phase differences between MMICs).

The radar receiving system may be a radar receiving system for receiving FMCW radar signals or for receiving PMCW (phase modulated continuous-wave) radar signals. Although the delay changes in the MMICs are not the same for PMCW as for FMCW, the effects at application level are the same, namely that a linear phase variation of the results of the Doppler FFT across antenna can be expected but in practical application phase errors differences occur when cascading MMICs. For compensation of those errors, a similar approach as described above for FMCW radar may be applied to PMCW radar. It should be noted that in case of PMCW, the reception processing does not include a range FFT. Still, there is a Doppler FFT which results in values for range/Doppler bins.

The radar receiving system may use various modulation types such as TDM (Time Division Multiplexing), CDM (Code Division Multiplexing), DDM (Doppler Division Multiplexing).

The components of the radar receiving system 1900 may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor. A "circuit" may also be software being implemented or executed by a processor, e.g. any kind of computer program. Any other kind of implementation of the respective functions which are described herein may also be understood as a "circuit" in accordance with an alternative embodiment. According to one embodiment, the receiving circuits are implemented as hardware (e.g. integrated) circuits.

Figure 20:
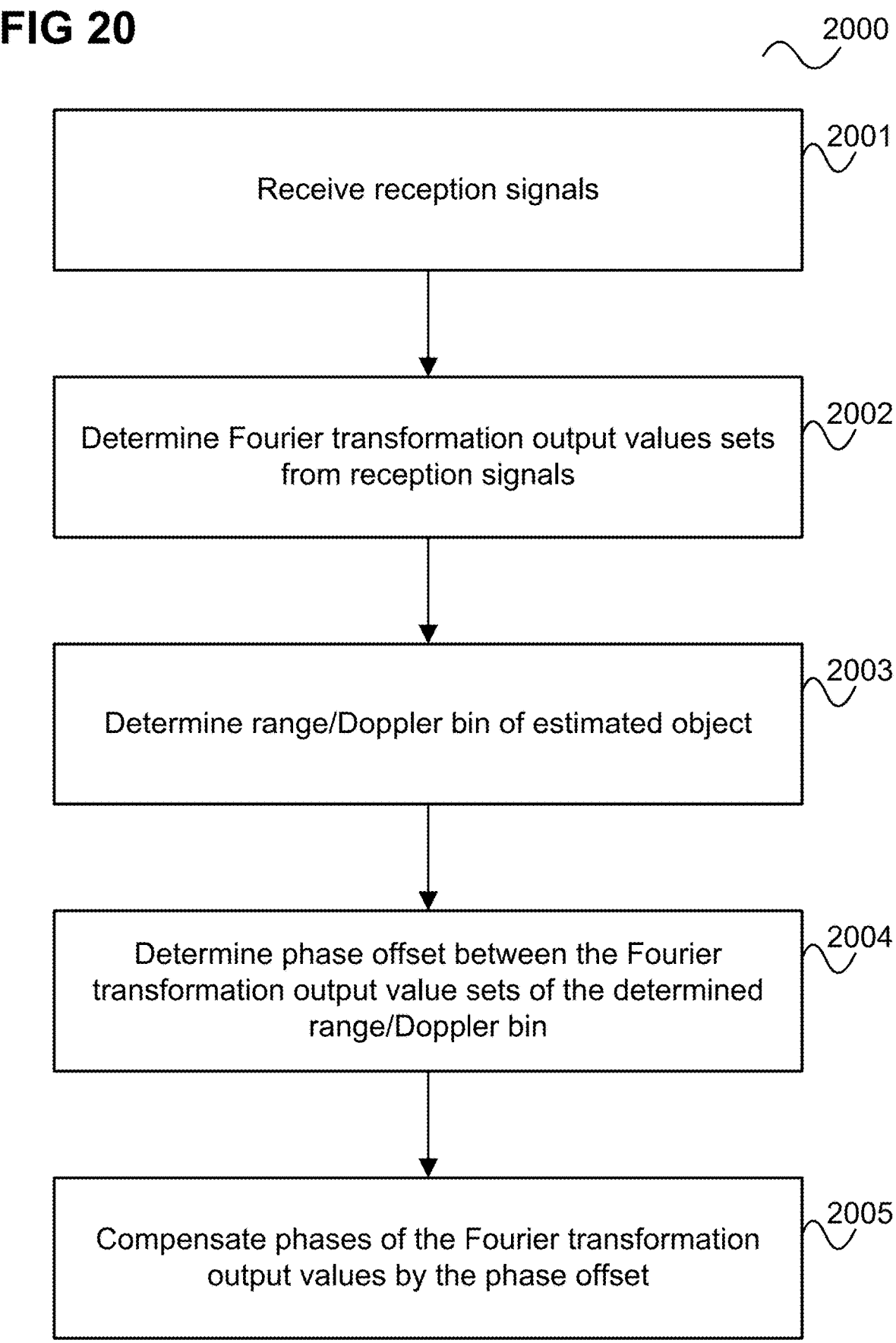
FIG. 20 shows a flow diagram illustrating an example method for compensating a phase error between radar receiving circuits according to one embodiment.

According to a further embodiment, a method is provided as illustrated in FIG. 20.

FIG. 20 shows a flow diagram illustrating an example method 2000 for compensating a phase error between radar receiving circuits.

In 2001, a first plurality of reception signals is received via a first plurality of antennas of a first receiving circuit and a second plurality of reception signals is received via a second plurality of antennas of a second receiving circuit.

In 2002, a first set of Fourier transformation output values including Fourier transformation output values assigned to each of a plurality of range/Doppler bins is generated from the first plurality of reception signals, and a second set of Fourier transformation output values including Fourier transformation output values assigned to each of the plurality of range/Doppler bins is generated from the second plurality of reception signals.

In 2003, a range/Doppler bin of the plurality of range/Doppler bins is determined (e.g. selected based on a certain criterion, e.g. based on a threshold) as an estimate of a range and speed of an object from the first set of Fourier transformation output values and the second set of Fourier transformation output values.

In 2004, a phase offset between the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate is determined.

In 2005, the phases of at least a part of the second set of Fourier transformation output values are compensated by the determined phase offset.

Various Examples are described in the following:

Example 1 is a radar receiving system as described with reference to FIG. 19.

Example 2 is the radar receiving system of Example 1, wherein the first plurality of antennas is a first antenna sub-array of a radio device antenna array and the second plurality of antennas is a second antenna sub-array of the radio device antenna array Example 3 is the radar receiving system of Example 2, wherein the first antenna sub-array or the second antenna sub-array or both are full linear arrays, sparse arrays, azimuth only arrays or being azimuth and elevation arrays.

Example 4 is the radar receiving system of any one of Examples 1 to 3, wherein the first set of Fourier transformation output values includes a Fourier transformation output value assigned to each of a plurality of range/Doppler bins for each of the first plurality of antennas and wherein the second set of Fourier transformation output values includes a Fourier transformation output value assigned to each of a plurality of range/Doppler bins for each of the second plurality of antennas.

Example 5 is the radar receiving system of Example 4, wherein the phase compensation circuit is configured to determine the phase offset such that after compensation of the phases of the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate fit a common model of a relation between antenna and of Fourier transformation output value phase.

Example 6 is the radar receiving system of Example 5, wherein the first plurality of antennas is a first antenna sub-array of a radio device antenna array and the second plurality of antennas is a second antenna sub-array of the radio device antenna array and the first plurality of antennas and the second plurality of antennas are arranged in a sequence in the antenna array and the relation is a relation between the antenna position in the sequence and the phase of the Fourier transformation output value assigned to the range/Doppler bin determined as the estimate for the antenna at the antenna position.

Example 7 is the radar receiving system of Example 6, wherein the common model is linear model giving a linear relation between antenna position in the sequence and the phase of the Fourier transformation output value assigned to the range/Doppler bin determined as the estimate for the antenna at the antenna position.

Example 8 is the radar receiving system of any one of Examples 5 to 7, wherein determining the phase offset includes minimizing the error between the phases of the Fourier transformation output values assigned to the range/Doppler bin determined as the estimate for the second plurality of antennas and the common model.

Example 9 is the radar receiving system of any one of Examples 5 to 8, wherein determining the phase offset includes determining a first model of the relation between antenna and of Fourier transformation output value phase for the first plurality of antennas, determining a second model of the relation between antenna and of Fourier transformation output value phase for the second plurality of antennas and determining the phase offset by minimizing an error between one or more model parameters of the common model and corresponding one or more model parameters of the first model and the second model over a set of candidate phase offsets.

Example 10 is the radar receiving system of Example 9, wherein the common model, the first model and the second model are linear models and the one or more model parameters are the slope of the respective linear model.

Example 11 is the radar receiving system of any one of Examples 1 to 10, wherein the phase compensation circuit is configured to determine the phase offset by means of a neural network.

Example 12 is the radar receiving system of Example 11, wherein the neural network is a neural network trained to determine a phase offset for at least one plurality of reception signals using an input of phases of a first plurality of reception signals and a second plurality of reception signals.

Example 13 is the radar receiving system of any one of Examples 1 to 12, wherein the phase compensation circuit is further configured to compensate the phases of at least a part of the first set of Fourier transformation output values by the determined phase offset.

Example 14 is the radar receiving system of Example 13, wherein the phase compensation circuit is configured to compensate the phases of at least a part of the Fourier transformation output values of the first set of Fourier transformation output values that are assigned to range/Doppler bins other than the range/Doppler bin determined as the estimate or the phases of at least a part of the Fourier transformation output values of the second set of Fourier transformation output values that are assigned to range/Doppler bins other than the range/Doppler bin determined as the estimate or both.

Example 15 is the radar receiving system of any one of Examples 1 to 14, further including a direction determination circuit configured to determine the direction of one or more objects using the phases of the Fourier transformation output values of the first set of Fourier transformation output values and the second Fourier transformation output values after the compensation by the phase compensation circuit.

Example 16 is the radar receiving system of any one of Examples 1 to 15, wherein the object detector is configured to determine the range/Doppler bin of the plurality of range/Doppler bins by determining the range/Doppler bin of the plurality of range/Doppler bins having the highest aggregate Fourier transformation output value over the first plurality of antennas and second plurality of antennas in terms of absolute value.

Example 17 is the radar receiving system of any one of Examples 1 to 16, wherein the first receiving circuit includes a first Monolithic Microwave Integrated Circuit and the second receiving circuit includes a second Monolithic Microwave Integrated Circuit.

Example 18 is the radar receiving system of any one of Examples 1 to 17, wherein the first receiving circuit is configured to generate a first plurality of intermediate frequency signals from the first plurality of reception signals and the second receiving circuit is configured to generate a second plurality of intermediate frequency signals from the second plurality of reception signals and wherein the spectral analyzer is configured to process the first plurality of intermediate frequency signals by a Fourier transformation over sampling times followed by a Fourier transformation over chirp times to generate the first set of Fourier transformation output values and to process the second plurality of intermediate frequency signals by a Fourier transformation over sampling times followed by a Fourier transformation over chirp times to generate the second set of Fourier transformation output values.

Example 19 is the radar receiving system of Example 18, wherein the phase compensation circuit is configured to compensate at least a part of the results of the Fourier transformation over sampling times of the second plurality of intermediate frequency signals by the determined phase offset.

Example 20 is the radar receiving system of any one of Examples 1 to 19, including a plurality of radar receiving devices, wherein at least some of the receiving circuits, the spectral analyzer, the object detector and the phase compensation unit are arranged in different radar receiving devices.

Example 21 is the radar receiving system of Example 20, wherein a first radar receiving device of the plurality of radar receiving devices includes the spectral analyzer and a second radar receiving device of the plurality of radar receiving devices includes the phase compensation circuit and the first radar receiving device is configured to transmit the first set of Fourier transformation output values and the second set of Fourier transformation output values to the second radar receiving device.

Example 22 is the radar receiving system of any one of Examples 1 to 21, wherein the radar receiving system is a frequency modulated continuous-wave radar receiving system, a phase modulated continuous-wave radar receiving system or an orthogonal frequency division multiplexing radar receiving system.

Example 23 is the radar receiving system of any one of Examples 1 to 22, configured to regularly determine a phase offset and to perform determination of one or more range/Doppler maps using a determined phase offset until determining a new phase offset.

Example 24 is a method for compensating a phase error between radar receiving circuits as described with reference to FIG. 20.

Example 25 is the method of Example 24, wherein the first plurality of antennas is a first antenna sub-array of a radio device antenna array and the second plurality of antennas is a second antenna sub-array of the radio device antenna array.

Example 26 is the method of Example 25, wherein the first antenna sub-array or the second antenna sub-array or both are full linear arrays, sparse arrays, azimuth only arrays or being azimuth and elevation arrays.

Example 27 is the method of any one of Examples 24 to 26, wherein the first set of Fourier transformation output values includes a Fourier transformation output value assigned to each of a plurality of range/Doppler bins for each of the first plurality of antennas and wherein the second set of Fourier transformation output values includes a Fourier transformation output value assigned to each of a plurality of range/Doppler bins for each of the second plurality of antennas.

Example 28 is the method of Example 27, including determining the phase offset such that after compensation of the phases of the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate fit a common model of a relation between antenna and of Fourier transformation output value phase.

Example 29 is the method of Example 28, wherein the first plurality of antennas is a first antenna sub-array of a radio device antenna array and the second plurality of antennas is a second antenna sub-array of the radio device antenna array and the first plurality of antennas and the second plurality of antennas are arranged in a sequence in the antenna array and the relation is a relation between the antenna position in the sequence and the phase of the Fourier transformation output value assigned to the range/Doppler bin determined as the estimate for the antenna at the antenna position.

Example 30 is the method of Example 29, wherein the common model is linear model giving a linear relation between antenna position in the sequence and the phase of the Fourier transformation output value assigned to the range/Doppler bin determined as the estimate for the antenna at the antenna position.

Example 31 is the method of any one of Examples 28 to 30, wherein determining the phase offset includes minimizing the error between the phases of the Fourier transformation output values assigned to the range/Doppler bin determined as the estimate for the second plurality of antennas and the common model.

Example 32 is the method of any one of Examples 28 to 31, wherein determining the phase offset includes determining a first model of the relation between antenna and of Fourier transformation output value phase for the first plurality of antennas, determining a second model of the relation between antenna and of Fourier transformation output value phase for the second plurality of antennas and determining the phase offset by minimizing an error between one or more model parameters of the common model and corresponding one or more model parameters of the first model and the second model over a set of candidate phase offsets.

Example 33 is the method of Example 32, wherein the common model, the first model and the second model are linear models and the one or more model parameters are the slope of the respective linear model.

Example 34 is the method of any one of Examples 24 to 33, including determining the phase offset by means of a neural network.

Example 35 is the method of Example 34, wherein the neural network is a neural network trained to determine a phase offset for at least one plurality of reception signals using an input of phases of a first plurality of reception signals and a second plurality of reception signals.

Example 36 is the method of any one of Examples 24 to 35, further including compensating the phases of at least a part of the first set of Fourier transformation output values by the determined phase offset.

Example 37 is the method of Example 36, including compensating the phases of at least a part of the Fourier transformation output values of the first set of Fourier transformation output values that are assigned to range/Doppler bins other than the range/Doppler bin determined as the estimate or the phases of at least a part of the Fourier transformation output values of the second set of Fourier transformation output values that are assigned to range/Doppler bins other than the range/Doppler bin determined as the estimate or both.

Example 38 is the method of any one of Examples 24 to 37, further including determining the direction of one or more objects using the phases of the Fourier transformation output values of the first set of Fourier transformation output values and the second Fourier transformation output values after the compensation.

Example 39 is the method of any one of Examples 24 to 38, including determining the range/Doppler bin of the plurality of range/Doppler bins by determining the range/Doppler bin of the plurality of range/Doppler bins having the highest aggregate Fourier transformation output value over the first plurality of antennas and second plurality of antennas in terms of absolute value.

Example 40 is the method of any one of Examples 24 to 39, including receiving the first plurality of reception signals by a first Monolithic Microwave Integrated Circuit and receiving the second plurality of reception signals by a second Monolithic Microwave Integrated Circuit.

Example 41 is the method of any one of Examples 24 to 40, wherein the first receiving circuit generates a first plurality of intermediate frequency signals from the first plurality of reception signals and the second receiving circuit generates a second plurality of intermediate frequency signals from the second plurality of reception signals and the method includes processing the first plurality of intermediate frequency signals by a Fourier transformation over sampling times followed by a Fourier transformation over chirp times to generate the first set of Fourier transformation output values and processing the second plurality of intermediate frequency signals by a Fourier transformation over sampling times followed by a Fourier transformation over chirp times to generate the second set of Fourier transformation output values.

Example 42 is the method of Example 41, including compensating at least a part of the results of the Fourier transformation over sampling times of the second plurality of intermediate frequency signals by the determined phase offset.

Example 43 is the method of any one of Examples 24 to 42, wherein at least some of the receiving, the generating, the determining of the estimate and determining of the phase offset are performed by different radar receiving devices.

Example 44 is the method of Example 43, including transmitting the first set of Fourier transformation output values and the second set of Fourier transformation output values from a first radar receiving device to a second radar receiving device which performs the determining of the phase offset.

Example 45 is the method of any one of Examples 24 to 44, wherein the reception signals are frequency modulated continuous-wave radar signals, phase modulated continuous-wave radar signals or orthogonal frequency division multiplexing radar signals.

Example 46 is the method of any one of Examples 24 to 45, including regularly determining a phase offset and performing determination of one or more range/Doppler maps using a determined phase offset until determining a new phase offset.

According to a further Example, a radar receiving system is provided including first receiving means for receiving a first plurality of reception signals via a first plurality of antennas of a first receiving circuit; second receiving means for receiving a second plurality of reception signals via a second plurality of antennas of a second receiving circuit; generating means for generating, from the first plurality of reception signals, a first set of Fourier transformation output values including Fourier transformation output values assigned to each of a plurality of range/Doppler bins and, from the second plurality of reception signals, a second set of Fourier transformation output values including Fourier transformation output values assigned to each of the plurality of range/Doppler bins; first determining means for determining a range/Doppler bin of the plurality of range/Doppler bins as an estimate of a range and speed of an object from the first set of Fourier transformation output values and the second set of Fourier transformation output values; second determining means for determining a phase offset between the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate and compensating means for compensating the phases of at least a part of the second set of Fourier transformation output values by the determined phase offset.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A radar receiving system for a vehicle, comprising:
   a first receiving circuit comprising a first plurality of antennas and configured to receive a first plurality of reception signals via the first plurality of antennas;
   a second receiving circuit comprising a second plurality of antennas and configured to receive a second plurality of reception signals via the second plurality of antennas;
   a spectral analyzer configured to generate, from the first plurality of reception signals, a first plurality of Fourier transformation output values, and from the second plurality of reception signals, a second plurality of Fourier transformation output values, the spectral analyser configured to assign the first plurality of Fourier transformation output values and the second plurality of Fourier transformation output values to a plurality of range/Doppler bins of an aggregate range/Doppler map;
   an object detector configured to determine a range/Doppler bin of the plurality of range/Doppler bins as an estimate of a range and speed of an object by determining the range/Doppler bin to which the Fourier transformation output value having the highest absolute value of the first plurality of Fourier transformation output values and the second plurality of Fourier transformation output values is assigned, wherein a first sub-plurality of the first plurality of Fourier transformation output values and a second sub-plurality of the second plurality of Fourier transformation output values are assigned to the determined range/Doppler bin; and
   a phase compensation circuit configured to:
      determine a phase offset between phases of the first sub-plurality of Fourier transformation output values and phases of the second sub-plurality of Fourier transformation output values, and
      adjust the phases of the second sub-plurality of Fourier transformation output values based on the determined phase offset to reduce the phase offset between the phases of the first sub-plurality of Fourier transformation output values and the phases of the second sub-plurality of Fourier transformation output values.

2. The radar receiving system of claim 1, wherein the first plurality of antennas comprises a first antenna sub-array of a radio device antenna array and the second plurality of antennas comprises a second antenna sub-array of the radio device antenna array.

3. The radar receiving system of claim 2, wherein the first antenna sub-array or the second antenna sub-array or both are full linear arrays, sparse arrays, azimuth only arrays, or azimuth and elevation arrays.

4. The radar receiving system of claim 1, wherein
   the first sub-plurality of Fourier transformation output values correspond to each of the first plurality of antennas, and
   the second sub-plurality of Fourier transformation output values correspond to each of the second plurality of antennas.

5. The radar receiving system of claim 4, wherein the phase compensation circuit is configured to determine the phase offset such that after the adjusting of the phases of the second sub-plurality of Fourier transformation output values based on the determined phase offset, the phases of the first sub-plurality of Fourier transformation output values and the phases of the second sub-plurality of Fourier transformation output values fit a common model of a relation between antenna and Fourier transformation output value phase.

6. The radar receiving system of claim 5, wherein
   the first plurality of antennas is a first antenna sub-array of a radio device antenna array, the second plurality of antennas is a second antenna sub-array of the radio device antenna array, the first plurality of antennas and the second plurality of antennas are arranged in a sequence in the antenna array, and the relation is a relation between antenna position in the sequence and Fourier transformation output value phase.

7. The radar receiving system of claim 6, wherein the common model is a linear model giving a linear relation between antenna position in the sequence and Fourier transformation output value phase.

8. The radar receiving system of claim 5, wherein the phase offset is determined such that an error between the phases of the first sub-plurality of Fourier transformation output values and the common model is minimized.

9. The radar receiving system of claim 5, wherein determining the phase offset comprises:

determining a first model of the relation between antenna and the phases of the first sub-plurality of Fourier transformation output value, determining a second model of the relation between antenna and the phases of the second sub-plurality of Fourier transformation output value, and determining the phase offset by minimizing an error between one or more model parameters of the common model and corresponding one or more model parameters of the first model and the second model over a set of candidate phase offsets.

10. The radar receiving system of claim 9, wherein the common model, the first model and the second model are linear models and the one or more model parameters are the slope of the respective linear model.

11. The radar receiving system of claim 1, wherein the phase compensation circuit is configured to determine the phase offset by means of a neural network.

12. The radar receiving system of claim 11, wherein the neural network is a neural network trained to determine a phase offset for at least one plurality of reception signals using an input of phases of a first plurality of reception signals and a second plurality of reception signals.

13. The radar receiving system of claim 1, wherein the phase compensation circuit is further configured to adjust the phases of the first sub-plurality of Fourier transformation output values based on the determined phase offset to reduce the phase offset between the phases of the first sub-plurality of Fourier transformation output values and the phases of the second sub-plurality of Fourier transformation output values.

14. The radar receiving system of claim 13, wherein the phase compensation circuit is configured to adjust the phases of at least a part of the Fourier transformation output values of the first plurality of Fourier transformation output values that are assigned to range/Doppler bins other than the determined range/Doppler bin and/or the phases of at least a part of the Fourier transformation output values of the second plurality of Fourier transformation output values that are assigned to range/Doppler bins other than the determined range/Doppler bin.

15. The radar receiving system of claim 1, further comprising a direction determination circuit configured to determine the direction of one or more objects using the phases of the first plurality of Fourier transformation output values and the phases of the second plurality of Fourier transformation output values after the adjustment by the phase compensation circuit.

16. The radar receiving system of any one of claim 1, wherein the first receiving circuit comprises a first Monolithic Microwave Integrated Circuit and the second receiving circuit comprises a second Monolithic Microwave Integrated Circuit.

17. The radar receiving system of claim 1, wherein the first receiving circuit is configured to generate a first plurality of intermediate frequency signals from the first plurality of reception signals, the second receiving circuit is configured to generate a second plurality of intermediate frequency signals from the second plurality of reception signals, and the spectral analyzer is configured to:

process the first plurality of intermediate frequency signals by a Fourier transformation over sampling times followed by a Fourier transformation over chirp times to generate the first plurality of Fourier transformation output values, and process the second plurality of intermediate frequency signals by a Fourier transformation over sampling times followed by a Fourier transformation over chirp times to generate the second plurality of Fourier transformation output values.

18. The radar receiving system of claim 17, wherein the phase compensation circuit is configured to adjust at least a part of the results of the Fourier transformation over sampling times of the second plurality of intermediate frequency signals based on the determined phase offset.

19. A method for compensating a phase error between radar receiving circuits comprising:

receiving a first plurality of reception signals via a first plurality of antennas of a first receiving circuit;

receiving a second plurality of reception signals via a second plurality of antennas of a second receiving circuit;

generating, from the first plurality of reception signals, a first plurality of Fourier transformation output values, and from the second plurality of reception signals, a second plurality of Fourier transformation output values;

assigning the first plurality of Fourier transformation output values and the second plurality of Fourier transformation output values to a plurality of range/Doppler bins of an aggregate range/Doppler map;

determining a range/Doppler bin of the plurality of range/Doppler bins as an estimate of a range and speed of an object by determining the range/Doppler bin to which the Fourier transformation output value having the highest absolute value of the first plurality of Fourier transformation output values and the second plurality of Fourier transformation output values is assigned, wherein a first sub-plurality of the first plurality of Fourier transformation output values and a second sub-plurality of the second plurality of Fourier transformation output values are assigned to the determined range/Doppler bin;

determining a phase offset between phases of the first sub-plurality of Fourier transformation output values and phases of the second sub-plurality of Fourier transformation output values; and adjusting the phases of the second sub-plurality of Fourier transformation output values based on the determined phase offset to reduce the phase offset between the phases of the first sub-plurality of Fourier transformation output values and the phases of the second sub-plurality of Fourier transformation output values, wherein the phase offset is determined such that after the adjusting of the phases of the second sub-plurality of Fourier transformation output values based on the determined phase offset, the phases of the first sub-plurality of Fourier transformation output values and the phases of the second sub-plurality of Fourier transformation output values fit a common model of a relation between antenna and Fourier transformation output value phase.

* * * * *